United States Patent [19]
Arbab et al.

[11] Patent Number: 5,821,001
[45] Date of Patent: Oct. 13, 1998

[54] COATED ARTICLES

[75] Inventors: Mehran Arbab, Allison Park; Russell C. Criss, Pittsburgh; Larry A. Miller, Sarver, all of Pa.

[73] Assignee: PPG Industries, Inc., Pittsburgh, Pa.

[21] Appl. No.: 807,352

[22] Filed: Feb. 27, 1997

Related U.S. Application Data

[60] Provisional application No. 60/015,718 Apr. 25, 1996.
[51] Int. Cl.$^6$ .............................. B32B 17/06; B21D 39/00
[52] U.S. Cl. ........................... 428/623; 428/630; 428/632; 428/633; 428/670
[58] Field of Search ..................................... 428/623, 630, 428/632, 633, 670

[56] References Cited

U.S. PATENT DOCUMENTS

| | | | |
|---|---|---|---|
| 4,610,771 | 9/1986 | Gillery | 204/192.1 |
| 4,716,086 | 12/1987 | Gillery et al. | 428/630 |
| 4,806,220 | 2/1989 | Finley | 204/192.27 |
| 5,110,662 | 5/1992 | Depauw et al. | 428/192 |

FOREIGN PATENT DOCUMENTS 0 747 330  12/1996  European Pat. Off. .

OTHER PUBLICATIONS

Minami, T. et al., "Properties of transparent zinc–stannate conducting films prepared by radio frequency magnetron sputtering", *Journal of Vacuum Science and Technology A*, vol. 13, No. 3 (1995) pp. 1095–1099.

*Primary Examiner*—Ponnathapura Achutamurthy
*Attorney, Agent, or Firm*—Donald C. Lepiane

[57] ABSTRACT

Multilayer high transmittance, low emissivity coatings on transparent substrates feature a special antireflective base film of at least two parts on the substrate-near side of a metallic, reflective film. A first of the two parts is in contact with the metallic film. This first film-part has crystalline properties for causing the metallic film to deposit in a low resistivity configuration. The second of the two film-parts supports the first part and is preferably amorphous. Coated articles of the invention also feature, in combination with the above-mentioned base film or independently thereof, a newly discovered, particularly advantageous subrange of thicker primer films for coated glass that can be thermally processed for tempering, heat strengthening, or bending.

38 Claims, 14 Drawing Sheets

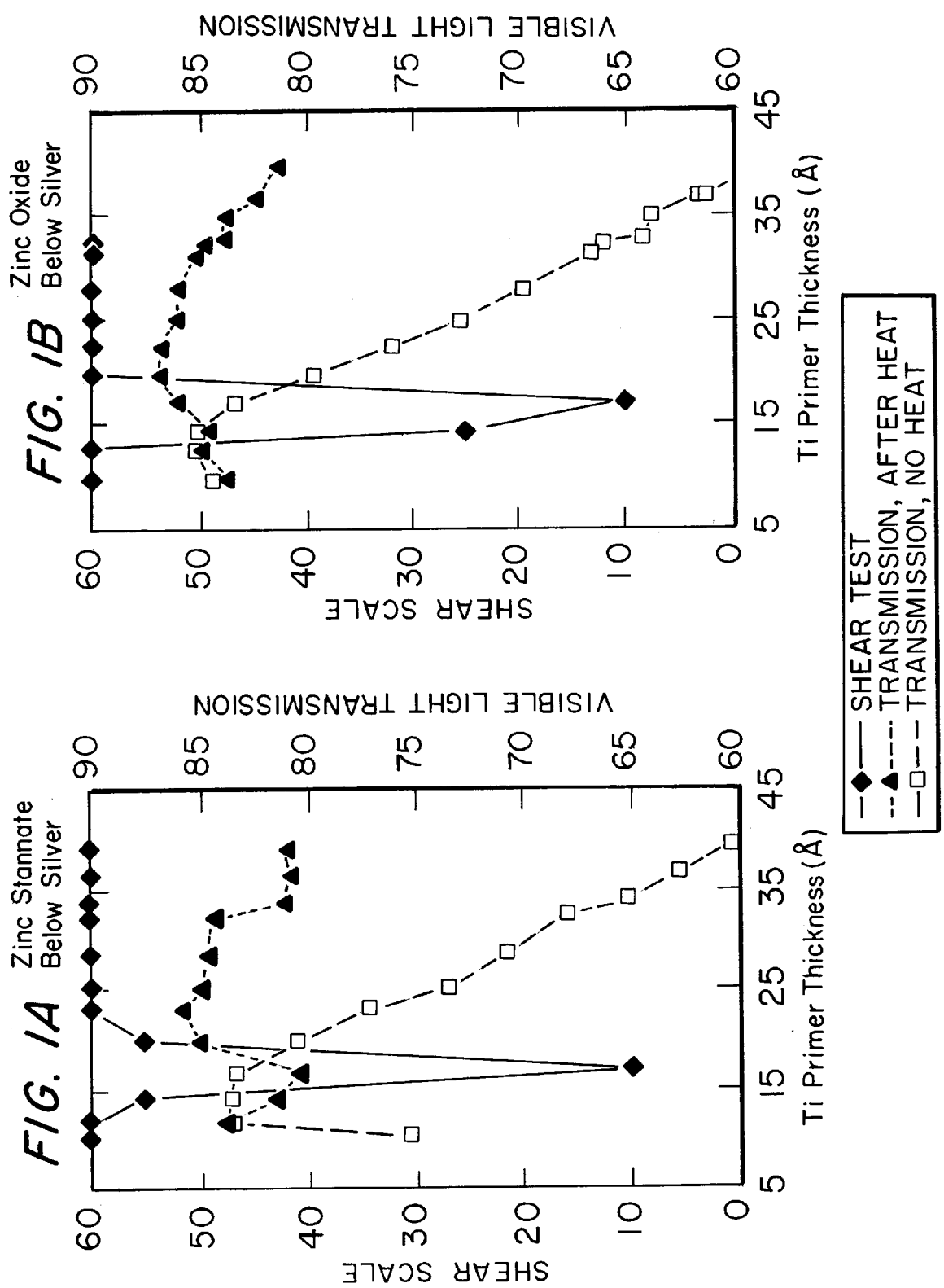

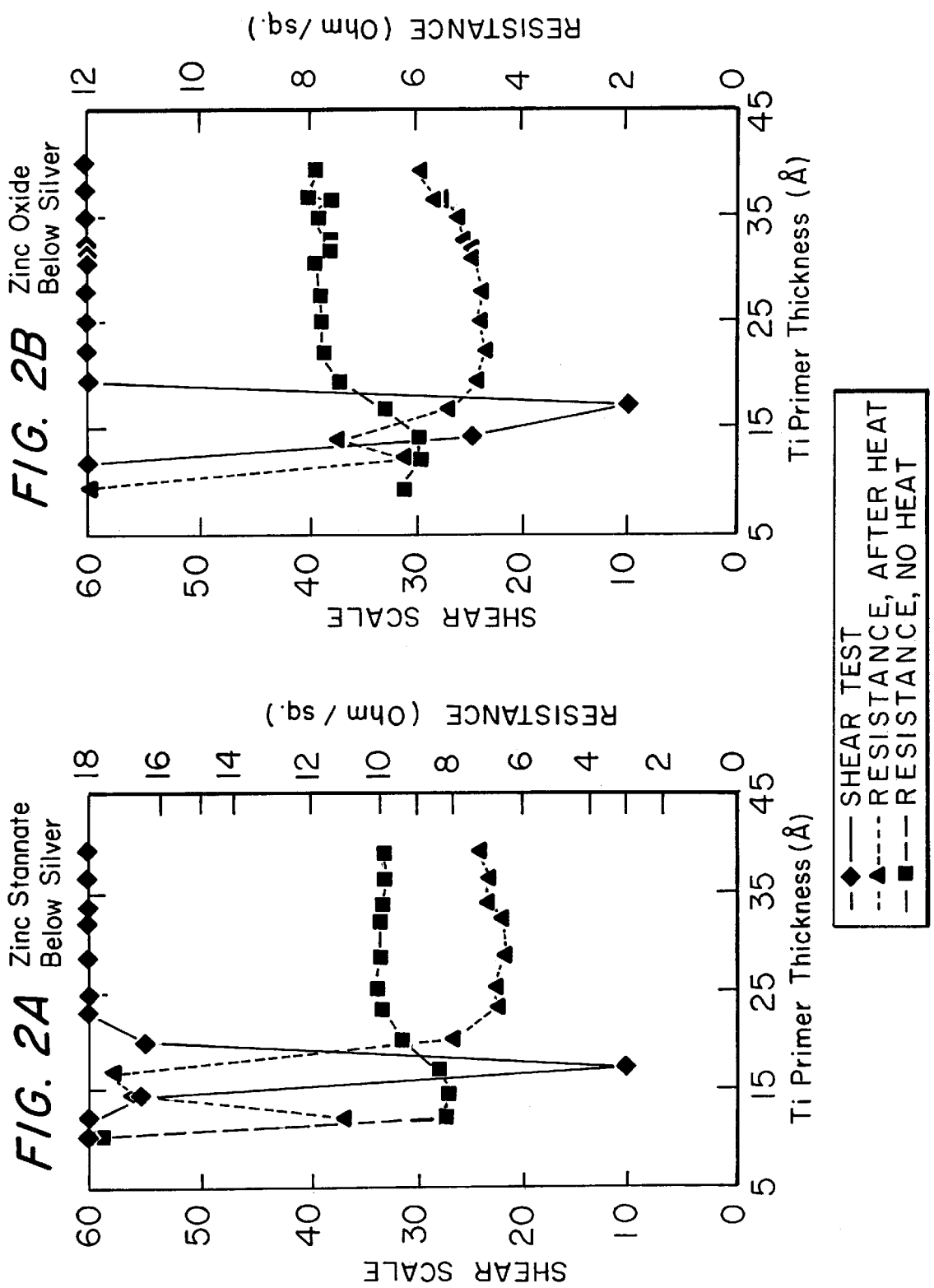

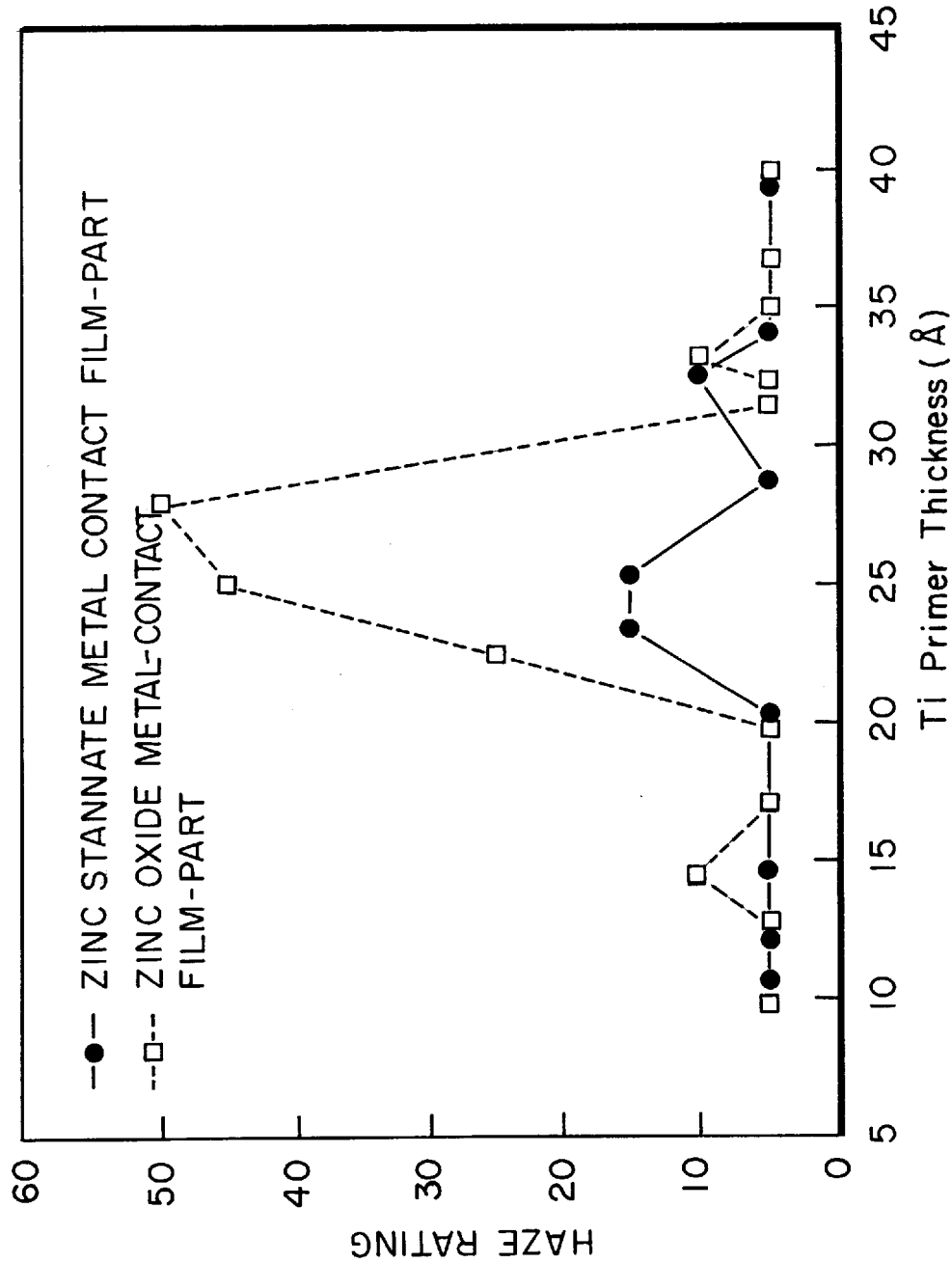

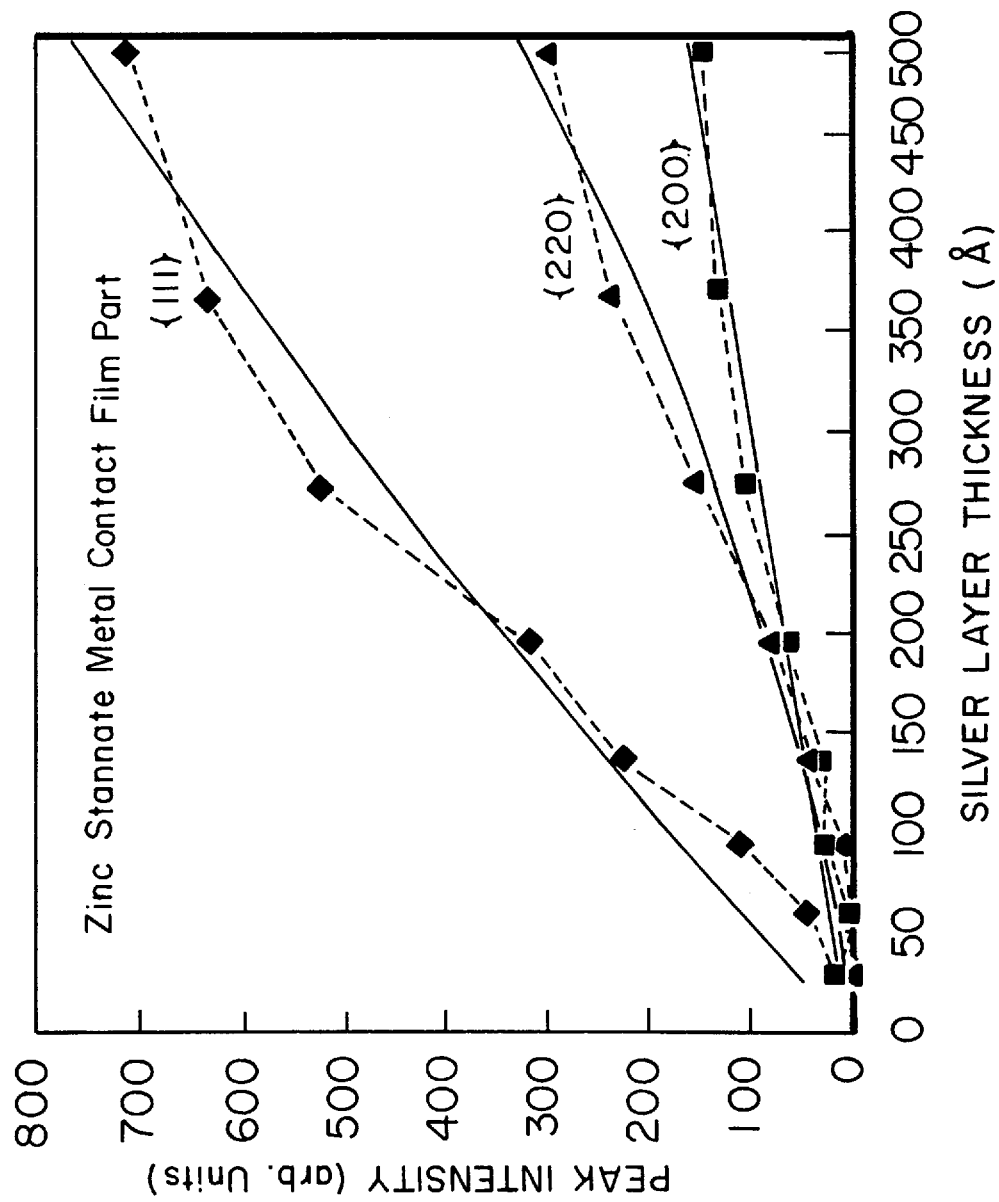

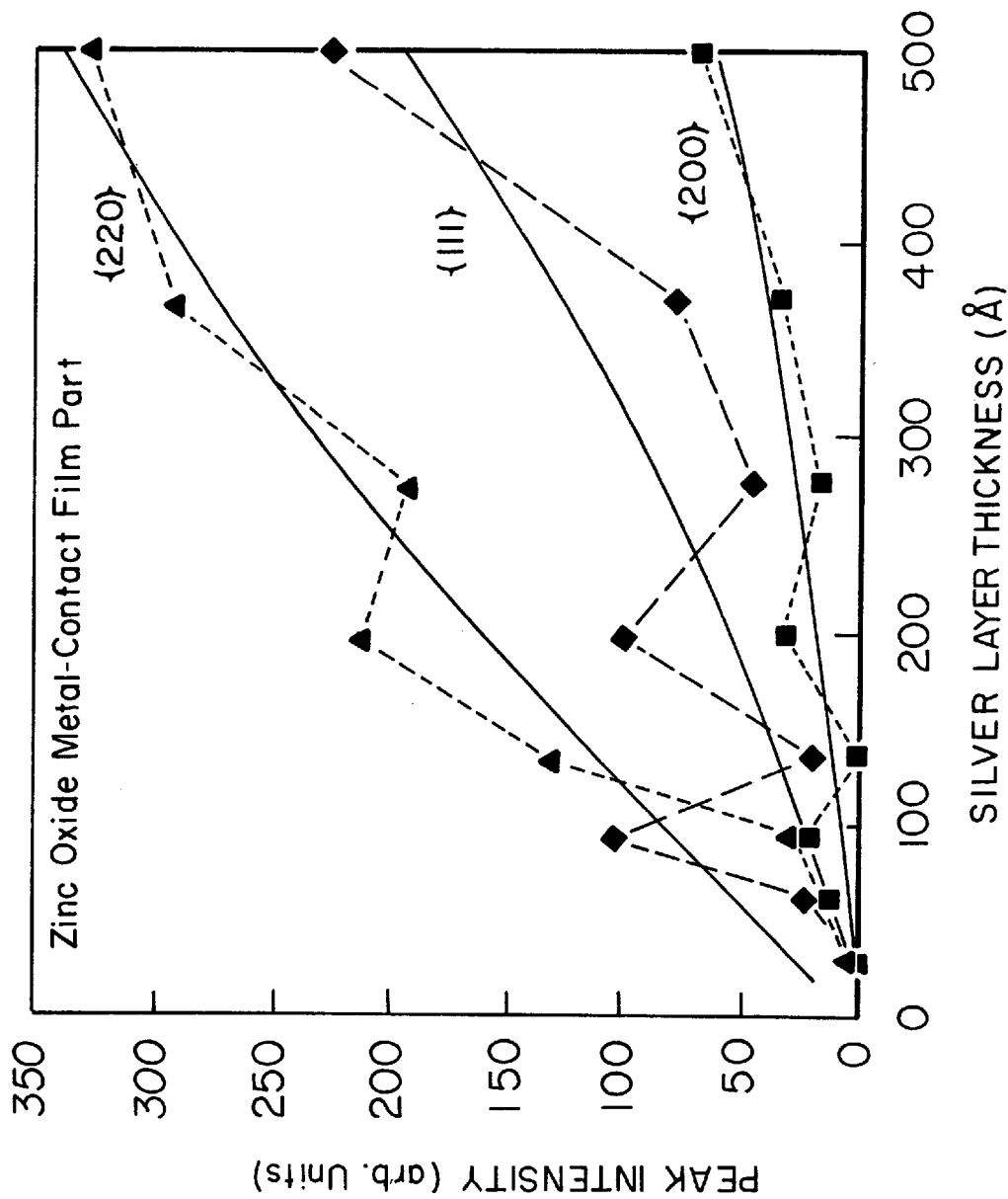

FIG. 9

| Sample Number | Layer | 1 | 2 | 3 | 4 | 5 | 6 | 7 | 8 | Resistance Ohm/sq. | Emissivity |
|---|---|---|---|---|---|---|---|---|---|---|---|
| G | Cathode | Zn | Ag | Ti | Zn | Ag | Ti | Zn | Ti | 3.52 | 0.06 |
|   | Gas Flow(%) | 50O$_2$-50Ar | Ar | Ar | 50O$_2$-50Ar | Ar | Ar | 50O$_2$-50Ar | 50O$_2$-50Ar | | |
|   | Power (kW) | 3.0 | 0.4 | 0.4 | 3.0 | 0.6 | 0.4 | 3.0 | 6.0 | | |
|   | Passes | 1 | 1 | 1 | 5 | 1 | 1 | 2 | 3 | | |
| H | Cathode | Zn | Ag | Ti | Zn | Ag | Ti | Zn | Ti | 2.92 | 0.05 |
|   | Gas Flow(%) | 80O$_2$-20Ar | Ar | Ar | 80O$_2$-20Ar | Ar | Ar | 80O$_2$-20Ar | 50O$_2$-50Ar | | |
|   | Power (kW) | 3.0 | 0.4 | 0.4 | 3.0 | 0.6 | 0.4 | 3.0 | 6.0 | | |
|   | Passes | 1 | 1 | 1 | 6 | 1 | 1 | 2 | 3 | | |
| I | Cathode | ZnSn | Ag | Ti | ZnSn | Ag | Ti | ZnSn | Ti | 3.55 | 0.06 |
|   | Gas Flow(%) | 65O$_2$-35Ar | Ar | Ar | 65O$_2$-35Ar | Ar | Ar | 65O$_2$-35Ar | 55O$_2$-35Ar | | |
|   | Power (kW) | 1.8 | 0.4 | 0.4 | 1.8 | 0.6 | 0.4 | 1.8 | 6.0 | | |
|   | Passes | 4 | 1 | 1 | 10 | 1 | 1 | 3 | 3 | | |
| J | Cathode | Zn | Ag | Ti | Zn | Ag | Ti | Zn | Ti | 2.85 | 0.05 |
|   | Gas Flow(%) | 80O$_2$-20Ar | Ar | Ar | 80O$_2$-20Ar | Ar | Ar | 80O$_2$-20Ar | 50O$_2$-50Ar | | |
|   | Power (kW) | 3.0 | 0.4 | 0.4 | 3.0 | 0.6 | 0.4 | 3.0 | 6.0 | | |
|   | Passes | 1 | 1 | 1 | 6 | 1 | 1 | 2 | 3 | | |

\* All samples were prepared in an Airco ILS1600 system at a line speed of 120 inches per minute and at a total working gas pressure of 4m Torr.

COATED ARTICLES

This application claims the benefit of U.S. Provisional Application No. 60/015,718 filed Apr. 25, 1996.

BACKGROUND OF THE INVENTION

1. Field of the Invention

The present invention relates generally to the art of multilayered films or coatings providing high transmittance and low emissivity, to articles coated with such films or coatings, and more particularly to such coatings or films formed of metal and metal oxides and deposited on transparent substrates.

2. Discussion of the Presently Available Technology

High transmittance, low emissivity films or coatings generally include a reflective metal film or layer which provides infrared reflectance and low emissivity, sandwiched between dielectric, antireflective films or layers of metal oxides to reduce the visible reflectance. These multilayer coatings are typically produced by cathode sputtering, especially magnetron sputtering.

U.S. Pat. No. 4,610,771 to Gillery provides a film composition of an oxide of a zinc-tin alloy, as well as multiple-layer films of silver and zinc-tin alloy oxide layers for use as a high transmittance, low emissivity coating. This oxide film may have the composition of zinc stannate ($Zn_2SnO_4$), but may also range from that exact composition.

U.S. Pat. No. 4,806,220 to Finley discloses a multilayer film coating suitable for high temperature processing. A type of this coating utilizes metal primer layers e.g. titanium primer layer both above and below a reflective metal layer of greater thickness than usual, up to 50 Angstroms in thickness.

It would be desirable to produce high transmittance films and article coated with such films that have minimal emissivity, low electrical resistivity and improved shear resistance, which exhibit improved resistance to weathering and can withstand high temperature processing where the use of a titanium primer layer below the reflective metal layer may be avoided. Alternatively, in the case where more than one reflective metal layer is present, it would be desirable to avoid the use of a titanium primer adjacent the substrate-near side of any of the reflective metal layers.

SUMMARY OF THE INVENTION

The present invention is directed to multilayer high transmittance, low emissivity coatings on transparent substrates which feature an antireflective base film of at least two parts on the substrate-near side of a metallic, reflective film, that is to say the side of the metallic reflective film that is in parallel facing relationship with the substrate. A first of the two parts is in contact with the metallic film. This first film-part has crystalline properties for causing the metallic film to deposit in a low resistivity structure. The second of the two film-parts supports the first part and is of a chemically and thermally more durable, preferably amorphous, material. The present invention includes both coatings having a single metallic reflective film and coatings with multiple metallic, reflective films, in which case the novel base film of the present invention can be utilized for just one of the multiple metallic films, for several or for all of them.

More particularly the present invention is directed to a high transmittance, low emissivity coated article having:

a transparent, nonmetallic substrate;

a dielectric, antireflective base film deposited over the substrate, the base film including a crystalline metal-contacting film-part and a support film-part where the support film-part is over and may be in contact with the substrate and wherein the support film-part includes a material other than the crystalline metal-contacting film-part;

a metallic reflective film deposited on the crystalline metal-contacting film-part of the base film;

a primer film deposited on the metallic reflective film; and a dielectric, antireflective film deposited on the primer film.

In an alternative embodiment of the present invention, an exterior protective overcoat layer is deposited on the dielectric, antireflective film.

In a preferred embodiment of the present invention, the transparent, nonmetallic substrate is glass, the support film-part is a zinc stannate film, the crystalline metal-contacting film-part is a zinc oxide film; the metallic reflective film is a silver film, the primer film is deposited as titanium metal, the dielectric, antireflective film is a zinc stannate film, and the exterior protective overcoat layer is a titanium oxide film.

Coated articles of the invention also feature, in combination with the above-mentioned base film or independently thereof, a newly discovered, particularly advantageous sub-range of the thicker primer layers, or films, of the above-referenced U.S. Pat. No. 4,806,220 to Finley.

NOMENCLATURE AND MEASUREMENT TECHNIQUES

When referring to crystal planes herein, representation of the planar indices within braces, i.e. {}, is a reference to all planes of that form. This convention is explained, for instance, in Cullity's "Elements of X-Ray Diffraction", Addison-Wesley, 1956, pages 37–42.

Gas percentages herein are on a flow (volume/unit time, standard cubic centimeters per minute ("SCCM")basis.

Disclosed thicknesses of the various layers of the multiple layered coatings of the present invention herein are determined on the basis of two different procedures, depending on whether layer is a dielectric layer or a metal layer.

The thickness of dielectric layers, or films, is determined by the aid of a commercial stylus profiler (hereinafter referred to as the "Stylus Method"), as follows. Before the deposition of each layer, a narrow line is drawn on the glass substrate with an acetone soluble ink. Following the deposition of the coating the line, and that portion of the coating deposited over it, is removed by wetting the surface with acetone and gently wiping with laboratory tissue. This creates a well-defined step on the surface of the glass whose height is equal to the thickness of the layer and can be measured with a profiler.

Two potential complications make the Stylus Method used for measuring the thickness of dielectric layers less favorable for measuring the thickness of thin metal films. First, metals, such as titanium and silver, are more prone to abrasion when wiped. Second, metals react readily with the ambient atmosphere when removed from a vacuum chamber. Both of these phenomena can result in significant errors if thickness measurements are made via the Stylus Method.

As an alternative, a method that will be referred to as the "XRF Method" herein is used to measure the thickness of metal layers. The XRF method uses a calibrated x-ray fluorescence instrument to measure the weight of the metal per unit area of the coating (namely, in $\mu g/cm^2$). The XRF method makes the assumption that the metal film is as dense as its bulk form. With this assumption, the metal film's measured weight per unit area is then converted to a thickness in Angstroms, using its bulk density.

For completeness sake, it should be noted that sputtered metal films are often less dense than their corresponding bulk metals, so that above described assumption is not always precisely correct, and the XRF Method may in some cases underestimate the thickness of the metal film due to this variation in density. Thus, for the thin metal films, the initial measurement of weight per unit area ($\mu g/cm^2$) is more accurate than the corresponding conversion to thickness based upon bulk density. Nonetheless, the XRF Method provides a useful approximation for comparing the relative thicknesses of the layers in a coating. Thickness tolerances given herein represent twice the standard deviation of the measurements.

BRIEF DESCRIPTION OF DRAWINGS

FIG. 1A is a plot which shows the effect of primer thickness on shear resistance and visible light transmittance for a multilayered film with amorphous zinc stannate contacting the substrate-near side of silver, before and after heat treatment.

FIG. 1B is a plot which shows the effect of primer thickness on shear resistance and visible light transmittance for a multilayered film with crystalline zinc oxide contacting the substrate-near side of silver before and after heat treatment.

FIG. 2A is a plot which shows the effect of primer thickness on shear resistance and sheet electrical resistance for a multilayered film with amorphous zinc stannate contacting the substrate-near side of silver, before and after heat treatment.

FIG. 2B is a plot which shows the effect of primer thickness on shear resistance and sheet electrical resistance for a multilayered film with crystalline zinc oxide contacting the substrate-near side of silver, before and after heat treatment.

FIG. 3 is a plot which compares the haze rating versus primer thickness of a multilayered film with crystalline zinc oxide contacting the substrate-near side of silver with a multilayered film with amorphous zinc stannate contacting the substrate near side of silver.

FIG. 7A is a plot of peak intensity of silver {111}, {200} and {220} planes versus silver layer thickness for an amorphous zinc stannate metal-contact film-part including second order polynomial fits to data, determined by using regression analysis.

FIG. 7B is a plot of peak intensity of silver {111}, {200} and {220} planes versus silver layer thickness for a zinc oxide metal-contact film part including second order polynomial fits to data, determined by using regression analysis.

FIG. 9 is a table of Samples G–J showing film structures, deposition conditions, resistance and emissivity parameters.

DETAILED DESCRIPTION OF THE PREFERRED EMBODIMENTS

Two Part Base Films

Figure 4A:
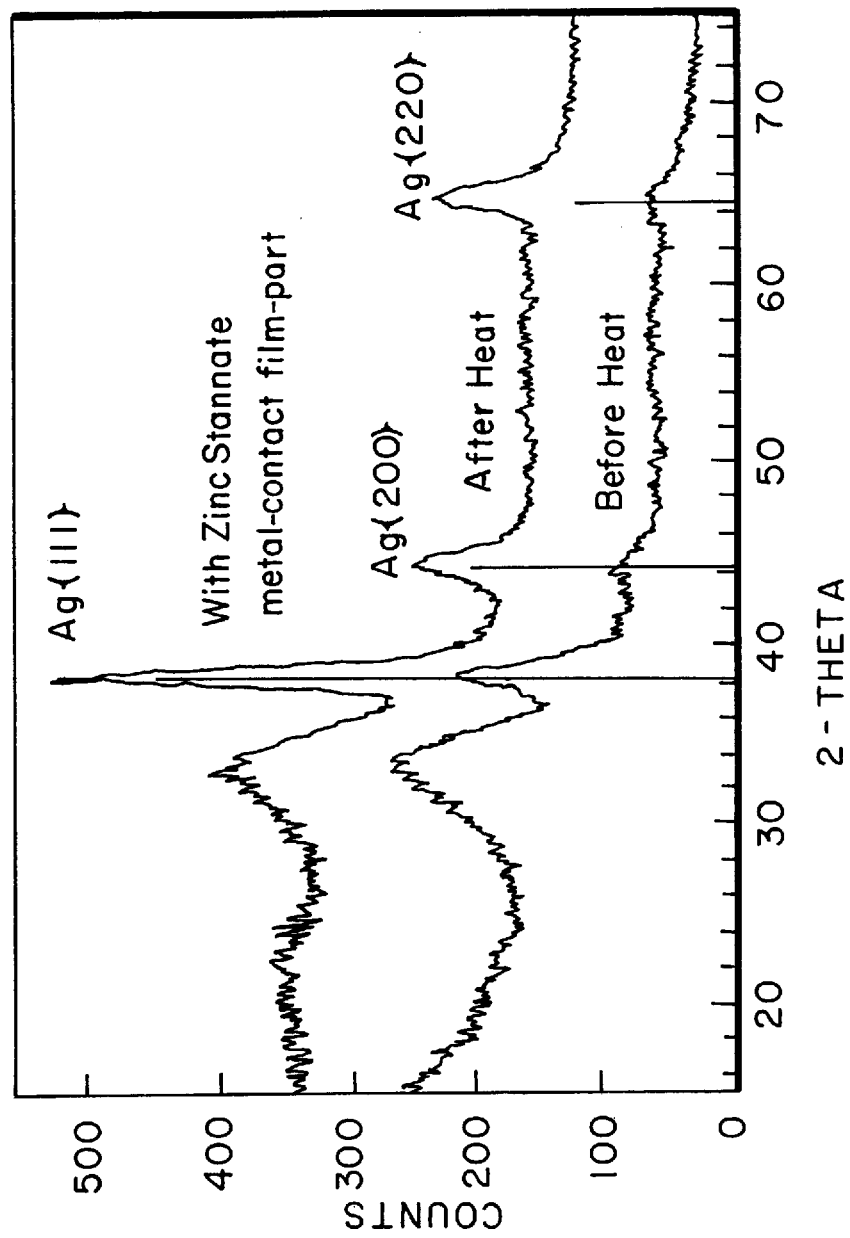
FIG. 4A is a plot which shows the before-heat and after-heat grazing angle x-ray diffraction spectra of Sample E of Table 1 wherein the zinc oxide metal-contact film-part is not present and the zinc stannate is in contact with the silver.

The base films of the present invention exhibit certain special characteristics. They have, for instance, an atom arrangement conducive to deposition of a low resistance, metallic, reflective film on top of them. Additionally, they exhibit chemical and heat stability.

According to the present invention, this desired combination of characteristics is achieved by a base film having at least two parts, a metal-contact film-part having crystallization-directing properties, and a support film-part providing a stable foundation for the metal-contact film-part.

The coated articles of the present invention include a two-part antireflective base film formed on a substrate-near side of a metallic, reflective film. The metallic reflective film has two levels of electrical resistivity, one level being lower than the other. In the practice of the invention, the lower of the two levels is preferred and is achieved by the two-part antireflective base film as discussed below. A first of the two film-parts, termed the "metal-contact film-part", is in contact with the metallic film. The material of this first part has crystalline properties for causing the atoms forming the metallic film to deposit in the lower of the two electrical resistivity levels. The second of the two parts, termed the "support-part", supports the first part. The second part is chemically more durable than the first part, and is preferably an amorphous material, as compared to the first. The present invention is applicable both for coatings having a single metallic, reflective film and for coatings with multiple metallic, reflective films, in which case a base film of the invention can be utilized for just one of the multiple metallic films, for several, or for all of them.

The Metal-Contact Film-Part

The metal-contact film-part is chosen on the basis of an ability to cause the atoms of the metallic, reflective film to deposit in a form characterized by a low resistivity level. The metallic, reflective film and the metal-contact film-part coordinate with one another, by which is meant that a low resistivity level of the metallic, reflective film is associated with a particular structural character of the metal-contact film-part. The crystal structure of the metallic, reflective film may, for instance, exhibit an orientation relationship with the metal-contact film-part. That, in turn, may result in larger grains, or alternatively speaking, smaller grain boundary area, or less of other electron scattering defects, within the film.

In general, the material chosen for the metal-contact film-part will depend on the identity of the metallic, reflective film, whether the metallic, reflective film be, for example, gold, copper, or silver.

In the case where the metallic, reflective film is silver, an example of a suitable material for the metal-contact part of the base film is zinc oxide. In depositing the zinc oxide, care must be taken to select process parameters that provide the zinc oxide with a suitable crystallinity or preferential crystal growth orientation for favorably affecting deposition of the silver atoms. One way of doing this is to have a preponderance of oxygen over argon during the sputtering of a cast zinc metal target.

Another example of a suitable material for the metal-contact part of the base film is zinc aluminum oxide sputtered from a ceramic tile of appropriate composition. Still another example of a suitable material for the metal-contact part of the base film is indium tin oxide.

The Support Film Part

The support film-part, which may be divided into subparts, has at least one part preferably in the form of a chemically and thermally resistant, preferably dielectric material. A suitable material is an amorphous sputtered oxide of zinc and tin, such as set forth in the above-referenced U.S. Pat. No. 4,610,771, the disclosure of which is incorporated herein by reference.

It is also possible to deposit other dielectric films such as an amorphous oxide of tin or bismuth. For a high transmission and low emissivity application, such dielectric films would be preferably non-absorbing in the visible and infra-red portion of the spectrum.

As between the three, the oxide of zinc and tin (also referred to herein as "zinc stannate", is preferred, because of its stronger bonding to the substrate and because of its greater chemical and thermal durability.

The Combined Metal-Contact Part and Support Film Part

In addition to being able to select base film-parts having the desired crystalline and amorphous properties described above, it is also necessary that they can be deposited with suitable thickness and index of refraction. For instance, the base film-parts must adhere to their adjoining materials with sufficient strength to withstand subsequent transportation, manufacturing operations, and use, such as installation into, and service in, multipane windows. Thickness and index of refraction affect the antireflection properties of the film, as is well known in the art.

The chemical durability of zinc stannate is superior to both zinc oxides and tin oxides. This is substantiated in the work of F. H. Gillery. An investigation of properties of zinc stannate is also reported by T. Minami et al. in "Properties of transparent zinc-stannate conducting films prepared by radio frequency magnetron sputtering", Journal of Vacuum Science and Technology A, Vol. 13, No. 3, (1995) pp. 1095–99. Therefore, because of zinc stannate's greater chemical durability, where the support film part of the base film is zinc stannate and the metal-contact film-part of the base film is zinc oxide, it is desirable to maximize the thickness of the zinc stannate layer for maximum chemical durability of the base film, and minimize the thickness of the zinc oxide layer, provided it remains of sufficient thickness to retain its ability to cause the metallic reflective film deposited on it to form its low resistance level, as explained above.

A preferred embodiment of the base film of the invention on a substrate is provided by the film-part sequence: substrate|oxide of zinc and tin|oxide of zinc, where: the oxide of zinc is the metal-contact film-part and the oxide of zinc and tin is the support film-part. Since only atoms in the vicinity of the surface of the metal contact film have an effect on the depositing atoms of a metallic, reflective film, the thickness of the metal-contact film-part should, as a general rule, be minimized to that which is required to obtain the desired lowering of the electrical resistance of the metal film as explained above, so that the more chemically and thermally durable support film part may be maximized. It is, however, understood that if the crystalline metal-contact film-part is itself of sufficient durability, or alternatively, sufficiently protected by layers above it, e.g. by the far-substrate anti-reflective layer or the protective overcoat that will be described below, then the entire base coat, or a larger portion of it, may be comprised of this material as will be demonstrated in Example 3.

For example, the metal-contact film-part may have a minimum thickness in the 20–30 Angstroms range, or below. On the other hand, greater thickness in the support film-part helps that part to resist diffusion and chemical attack, so that the thickness of the support part should be maximized. Total base film thickness is chosen to provide a suitable antireflection effect for the final appearance, e.g. color, of the product as is known in the art.

In addition to its favorable effect on the resistance of the reflective metal layer, the metal-contact film-part of the present invention was found to have a stabilizing influence on the structure of the reflective metal film during heat treatment that results in low haze. This will be demonstrated by example below and by FIGS. 3, 4A, and 4B.

As noted above, the base film of the invention will be located, for instance, between a transparent substrate and the first metallic, reflective film of the coating. If the coating contains more than one metallic, reflective film, a plurality of the base films may be used, one for each of the metallic, reflective films of the coating.

The Substrate

While for some forms of the invention, such as temperable window pane, glass, for instance soda-lime glass, is clearly the material of choice for the transparent substrate, nonmetallic substrates other than glass, such as various plastics, may be used.

The Metallic Reflective Film

As noted above, examples of suitable materials for forming the metallic, reflective films in articles of the present invention are gold, copper, and silver, with silver being preferred for most purposes, as is well known in the art. In general, a suitable metal is one which is a good conductor of electricity, i.e. one having low electrical resistance, since that characteristic correlates well with ability to block escape of heat from a heated house in the winter, or the influx of heat from hot surroundings during the summer. Longer wavelength infrared radiation of the heat reaching a window having the metallic film in its coating is reflected back from whence it came. This ability is typically measured in terms of the emissivity of the coated surface at room temperature (e.g. about 70° F. (21° C.)), with low emissivity being most desirable. Low emissivity may also be obtained by coatings that are not significantly reflective in the solar radiation range, e.g., in the near infrared.

The Primer Layer

On the substrate-far side of the metallic, reflective film, there will typically be a primer film of an oxygen-capturing metal, such as titanium. The titanium acts as a sacrificial layer, to protect the metallic, reflective film during later deposition of an antireflective oxide film on the substrate-far side of the metallic, reflective film. Primer films may comprise other metals such as zirconium.

The optimal thickness of the titanium layer varies depending upon whether the coated article of the present invention will be exposed to heat treatment during its production. Because the basic function of the primer layer is to protect the metallic, reflective film from oxidizing during the deposition of the antireflective oxide film on the substrate-far side of the metallic, reflective film, the primer layer may be thin where the coated article of the present invention will not receive heat treatment during its production. "Thin" here refers to primer film thicknesses on the order of 8 to 12 Angstroms. This is so because heat treatment is typically strongly oxidizing. In the absence of heat treatment, the thin primer layer will suffice to protect the metallic, reflective film from oxidizing during production of the coated article of the present invention. In an alternative embodiment of the present invention discussed in more detail below, the thin primer layer may be overcoated with a layer of zinc oxide to increase the shelf life of the coated article of the present invention.

However, if the coated article is to be heated during processing, a thicker primer layer may be used, as taught in the above-referenced U.S. Pat. No. 4,806,220, the disclosure of which is incorporated herein by reference. As mentioned in that patent, if a single primer layer is deposited over the reflective metal film, the primer thickness is preferably greater than 20 Angstroms, up to 50 Angstroms in thickness. This thicker primer layer will withstand the strongly oxidizing conditions of heat treatment.

It has been found with the present invention, that here the coated article will be exposed to heat treatment during its production, there is a point at which the primer layer may be made either too thin or too thick. Too thin a primer layer results in a lack of protection for the reflective, metallic film from oxidation at high temperature thus rendering the coated article unacceptable for heat treatment and in poor shear resistance which makes the article unsuitable for long distance shipment for later thermal processing. Too thick a primer layer, results in the formation of an undesirable haze in the coated article after heat treatment, also rendering it unacceptable for heat treatment.

The optimum range of titanium thickness that provides sufficient protection without forming undesirable haze is demonstrated in FIG. 3. Especially in conjunction with a zinc oxide metal-contact film-part, it has been found that the preferred subrange of the thickness of the primer layer that will provide a coated article suitable for heat treatment during its manufacture, is where the primer layer is in the vicinity of 20 Angstroms in thickness. Below that range the coating may have poor shear resistance and above that range the coating may develop haze to an unacceptable level after heat treatment. In the case of titanium metal primer, an empirically determined coating thickness giving adequate shear strength and acceptably low haze is in the range of from about 22 Angstroms to about 30 Angstroms. A preferred range is from about 24 Angstroms on the lower side to about 28 Angstroms on the upper side.

The Antireflective Film

The antireflective film on the substrate-far side of the metallic, reflective film is selected on the basis of index of refraction, adherence, and chemical durability, similarly as above. An example of a suitable material is oxide of zinc and tin. In the case of a coating having two metallic, reflective films, the antireflective film on the substrate-far side of the first metallic, reflective film can serve as a base film of the invention for the second metallic, reflective film.

The Protective Overcoat

Typically, a coating of the invention will be capped by an exterior, protective overcoat, such as a hard layer of titanium oxide. Such is taught by F. H. Gillery et al. in U.S. Pat. No. 4,716,086, the disclosure of which is incorporated herein by reference.

Layer Stack Arrangements of the Present Invention

Single Stack Suitable for Heat Treatment

In one embodiment of the present invention, there is provided a high transmittance, low emissivity coated article suitable for heat treatment having a single metallic, reflective layer, also known as a single stack, which includes:

a transparent, nonmetallic substrate;

a dielectric, antireflective base film deposited on the substrate, the base film including a crystalline metal-contacting film-part and a support film-part where the support film-part is in contact with the substrate and where the support film-part is comprised of a material other than the crystalline metal-contacting film-part;

a metallic reflective film deposited on the crystalline metal-contacting film-part of the base film;

a primer film deposited on the metallic reflective film; and a dielectric, antireflective film deposited on the primer film.

In an alternative embodiment of the present invention, an exterior protective overcoat layer deposited on the dielectric antireflective film.

In a preferred embodiment of the present invention, the transparent, nonmetallic substrate is glass, the support film-part is a zinc stannate film, the crystalline metal-contacting film-part is a zinc oxide film; the metallic reflective film is a silver film, the primer film is deposited as titanium metal, the dielectric, antireflective film is a zinc stannate film, and the exterior protective overcoat layer is a titanium oxide film.

Double Stack Suitable for Heat Treatment

In an alternative embodiment of the present invention there is provided a high transmittance, low emissivity coated article suitable for heat treatment having two metallic, reflective films, also known as a double stack, which includes:

a transparent, nonmetallic substrate;

a first dielectric, antireflective base film deposited on the substrate, the base film including a crystalline metal-contacting film-part and a support film-part where the support film-part is in contact with the substrate and where the support film-part is comprised of a material other than the crystalline metal-contacting film-part;

a first metallic reflective film deposited on the crystalline metal-contacting film-part of the base film;

a first primer film deposited on the metallic reflective film;

a second dielectric, antireflective base film deposited on the primer film, the second dielectric antireflective base film including a crystalline metal-contacting film-part and a support film-part where the support film-part is in contact with the primer film and where the support film-part is comprised of a material other than the crystalline metal-contacting film-part of the second base film;

a second metallic reflective film deposited on the crystalline metal-contacting film-part of the second base film;

a second primer film deposited on the second metallic reflective film; and a dielectric, antireflective film deposited on the second primer film.

In a preferred embodiment of the above described embodiment of the present invention, an exterior protective overcoat layer is deposited on the dielectric, antireflective film.

In a preferred embodiment of the above described alternative embodiment of the present invention, the transparent, nonmetallic substrate is glass, the support film-part of the first base film is a zinc stannate film, the crystalline metal-contacting film-part of the first base film is a zinc oxide film; the first metallic reflective film is a silver film, the first primer film is deposited as titanium metal, the support film-part of the second base film is a zinc stannate film, the crystalline metal-contacting film-part of the second base film is a zinc oxide film; the second metallic reflective film is a silver film, the second primer film is deposited as titanium metal, the dielectric, antireflective film is a zinc stannate film, and the exterior protective overcoat layer is a titanium oxide film.

Non-temperable Double Stack

In still another embodiment of the present invention, where the high transmittance, low emissivity coated article is a double stack including two reflective metallic films, and where it is not intended to be subjected to heat treatment during its manufacture, an article with improved shelf life may be obtained as follows. The article is formed by depositing the above described two part base film between the substrate and the first metallic, reflective film, and depositing a three part base film interposed between the two metallic, reflective films, and by interposing an additional zinc oxide layer as part of the dielectric antireflective film, between the second primer film and the zinc stannate dielectric antireflective film. In this embodiment, the coated article includes:

a transparent, nonmetallic substrate;

a first dielectric, antireflective base film deposited on the substrate, the base film including a crystalline metal-contacting film-part and a support film-part where the support film-part is in contact with the substrate and where the support film-part is comprised of a material other than the crystalline metal-contacting film-part;

a first metallic reflective film deposited on the crystalline metal-contacting film-part of the base film;

a first primer film deposited on the metallic reflective film;

a second deposited on the primitive base film deposited on the primer film, the second dielectric antireflective base film including a crystalline metal-contacting film-part which is a zinc oxide film, and a support film-part, wherein the support film-part is further comprised of a first layer of a zinc oxide film in contact with the first primer film and a second layer of a zinc stannate film in contact with the crystalline metal-contacting film part;

a second metallic reflective film deposited on the crystalline metal-contacting film-part of the second base film;

a second primer film deposited on the second metallic reflective film; and a dielectric, antireflective film deposited on the second primer film wherein the dielectric, antireflective film includes a first layer of a zinc oxide film deposited on the primer film and a second layer of a zinc stannate film deposited on the first zinc oxide layer of the dielectric, antireflective film.

In an alternative embodiment of the above described embodiment of the present invention, an exterior protective overcoat layer is deposited on the dielectric antireflective film.

In a preferred embodiment of the above described alternative embodiment of the present invention, the transparent, nonmetallic substrate is glass, the support film-part of the first base film is a zinc stannate film, the crystalline metal-contacting film-part of the first base film is a zinc oxide film; the first metallic reflective film is a silver film, the first primer film is deposited as titanium metal, the second metallic reflective film is a silver film, the second primer film is deposited as titanium metal, and the exterior protective overcoat layer is a titanium oxide film.

In the above described embodiments, the zinc oxide/zinc stannate portion of the three part base film forms the support film-part, and the zinc oxide film forms the metal-contact film-part.

The primer layer of this embodiment may be thinner than the embodiments subjected to heat treatment, on the order of 8–12 Angstroms, for the reasons set forth above.

The additional zinc oxide film of the dielectric antireflective film of the above described embodiment provides extended shelf life of the coated article of the present invention.

Manufacturing and Physical Characteristics of Heat Treatable and Non-Heat Treatable Articles Typically a window manufacturer utilizes window panes received from a glass pane manufacturer, which the window manufacturer incorporates into finished window products.

Certain window applications require tempered glass. Glass tempering is achieved by heating the article to a certain temperature followed by quenching of the heated article. Tempered glass is typically stronger than annealed glass. Further, tempered glass windows shatter into small pieces when impacted with sufficient force to break them, as opposed to non-tempered glass which will shatter in larger shards of glass.

One limitation of tempered glass is that it cannot be cut to size. Therefore, in one method of producing tempered glass windows, the pane manufacturer ships standard, cuttable sizes of annealed, temperable, pane to the window manufacturer. The window manufacturer cuts blanks from the larger standard sizes for the windows for which it has orders and then tempers the blanks so cut.

An alternative way of manufacturing tempered glass windows, is that the pane manufacturer, not the window manufacturer, does the tempering, either of temperable, coated pane, or of uncoated pane, followed by coating. However, in either case, this introduces the complication for the pane manufacturer of maintaining a wide variety of non-standard sizes in the pane manufacturer's operations and inventory or for substantial lead time for the pane manufacturer to make the panes and then ship them to the window manufacturer.

Where the glass is coated, heating in the tempering range anneals the coating layers and further stabilizes the thin film stack. Most notably, the resistivity of the silver layer(s) decreases and the titanium primer layer oxidizes and becomes more transparent in the visible range of the spectrum. On the other hand, also as a result of heating, sodium or other impurities can diffuse through the layers of the coating and overheating of the coated glass or, alternatively, extended exposure to high temperature may result in breakdown of the coating (as, for example, by agglomeration of silver into particles) and excessive haze.

As compared to uncoated clear glass, it is more difficult to increase the temperature of coated low-emissivity glass. The metallic, reflective metal film in low-emissivity glass effectively reflects much of the energy radiated from the heat source in a furnace. Therefore, the temperature of the heating element, its duty cycle, the line speed (residence time in the furnace), or all of the above have to be adjusted in order to achieve the desired final temperature in the coated glass. A lehr based on forced convection heat transfer may be advantageous in this respect.

Preferably, tempering is carried out in a lehr that can rapidly elevate the glass temperature to within the required range (1160° F. (627° C.) to 1250° F. (677° C.), preferably 1170° F. (632° C.) to 1200° F. (649° C.)). Rapid elevation of the temperature minimizes the high temperature exposure time and, as a result, the coating will obtain and retain its optimum properties. A high line speed, or short cycle time, can also be advantageous from a manufacturing point of view.

The lehr may be electric or a gas hearth. The lehr may be continuous, where glass travels at a constant speed through the furnace, or of a batch type, where glass enters the furnace and is held stationary, or is oscillated, for a given time. Upon leaving the lehr, the glass is immediately air quenched, in order to impart the temper.

Further illustrative of the invention are the following examples:

EXAMPLE 1

Heat Treatable Single Stack

A multiple layer coating which was comprised of: zinc stannate film|zinc oxide film|silver|titanium|zinc stannate|titanium dioxide was deposited on a substrate as follows, with the purpose of providing a coated glass pane which can be subsequently tempered. The substrate was a 3.3 mm (0.13 inch) thick pane of clear, annealed, soda-lime glass.

The coating of this example was deposited in a multi-chamber, in-line, magnetron sputtering, 84-inch (213 cm) coater, as manufactured by Airco Coating Technology of Fairfield, Calif. Different chambers in the coater were dedicated to the deposition of either metal or dielectric (oxide) layers and the glass moved at constant speed under cast metal cathode targets that were energized at all times. The gas composition in the oxide chambers was set at 80% oxygen-20% argon at a total pressure of 4 mTorr. Pure argon at a pressure of 5 mTorr was used in the metal deposition chambers.

The coating was formed by first depositing a two part antireflective dielectric base film (thickness of 318±4 Angstroms) consisting of a first support-part of a 257±13 Angstroms thick film of amorphous zinc stannate contiguous to the glass substrate and a second metal-contact film-part of a 58±7 Angstrom thick crystalline zinc oxide film deposited on the zinc stannate film. The zinc oxide film was multigrained, rather than single crystal. The thicknesses were measured by a stylus profiler. Due to the proximity of their optical indices, the above two parts together act as a single optical film with a transmittance of approximately 82%.

While in bulk form, the formula for zinc stannate is $Zn_2SnO_4$, its sputtered composition may vary as $Zn_xSnO_y$. Although the XRF method was described above as the preferred method to measure the thickness of metallic films, it can also be used in connection with dielectric films to determine the composition of the dielectric films as opposed to the thickness of such dielectric films. The composition of the zinc stannate film was determined by the XRF method as follows. The $\mu g/cm^2$ of the zinc and tin metals of the zinc stannate film was measured with the XRF method. Then, by assuming that the oxides are stoichiometric with their metal counterparts, i.e. $Zn=ZnO$ and $Sn=SnO_2$, this led to a composition which may alternatively be expressed as: Zn:Sn weight ratio of 0.93±0.12; Zn:Sn atom ratio of 1.7±0.2; or compound formula of approximately $Zn_{1.7x}Sn_xO_{3.7x}$.

Upon moving the substrate from the oxide deposition chambers to the metal deposition chamber, an approximately 115 Angstrom thick film of multigrained silver was deposited onto the crystalline zinc oxide upper part of the base film. The measured thickness of the base film plus silver film totaled 434±9 Angstroms and the transmittance of the coated glass, as measured by an in-line transmission monitor, was reduced to 63.5% due to the reflective silver film. The thickness of the silver film corresponds to approximately 10.0 $\mu g$ of this metal per $cm^2$, as measured by x-ray fluorescence.

Next, a sacrificial titanium primer film with a thickness equivalent to 1.1 $\mu/cm^2$ (corresponding to a thickness of about 24 Angstroms) was deposited on the top of the silver.

The deposition of the titanium primer film was followed by deposition of an antireflecting topcoat film of zinc stannate with a thickness of 230±7 Angstroms and a final titanium dioxide overcoat with a thickness of 36±6 Angstroms.

The above multilayer coating passed a shear resistance test (described in the following paragraph) by receiving a rating of 60. It had a sheet resistance of 7.1 Ω/sq. (to convert sheet resistance in Ω/sq. to resistivity in $\mu$ohm.cm, multiply values in Ω/sq. by silver film thickness in centimeters (1 Angstrom=$10^{-8}$ cm) and divide by $10^{-6}$) and an emissivity of $\epsilon$=0.12. The emissivities of coatings described herein were measured with a model AE Emissometer manufactured by Devices and Services Co. of Dallas, Tex. Measurements according to ASTM E 1585-93 using a Mattson Galaxi Model 5200 FTIR instrument with CsI optics generally yielded emissivity values of up to 20% less within the range of interest here. The visible light transmission of this sample was equivalent to 76% (VLT(D65), where D65 is reference to a standard illuminant) and its visible reflection was equivalent to Y(D65)=5.66% on its coated side. The coated side CIE 2° observer color coordinates of this sample were x=0.3350 and y=0.3239.

The shear resistance test consists of applying 20 successive strokes of a cloth wetted with deionized water against the coated surface of glass, followed by visual examination of the tested area. Depending on the appearance of the tested area, letter grades of D−, D, D+, . . . , A, A+ are assigned to the coating; then, for numerical analysis, assignments of 5 to D−, 10 to D, . . . 55 to A, and 60 to A+ are made. If a coating shows no signs of shear, not even barely visible scratches, then it receives a maximum rating of 60. Coatings that display uniform shear and delamination at any interface of the multi-layer coating within the test area receive a failing rating of zero. Other levels of performance receive intermediate scores. This method of coating durability characterization has been found to correlate well with field performance of the coating.

A 2 inch×8 inch (5.08 centimeter×20.32 centimeter) section of the above sample was heated to a maximum temperature of 1184° F. (640° C.) to simulate the thermal cycle of the tempering process. This resulted in a coating that retained a rating of 60 in the shear test (the coating gets even harder after tempering), and had no measurable haze, as measured with a haze meter (HAZEGARD Model No. XL-211, a product of Pacific Scientific Company, Silver Spring, Md.) and a very low level of coating haze when viewed using a dark room, flood-light haze test, as described in the following paragraph. The resistance and emissivity of the heated sample improved to 4.5 Ω/sq. and 0.07, respectively, while its visible light transmission increased to 88.0%. The reflected color coordinates of the coated side of the sample shifted to a neutral color of Y(D65)=5.2, x=0.2812 and y=0.2860 after heat.

In the dark room, floodlight haze test, the coated specimen is viewed in reflection in a dark room at various viewing angles relative to a spotlight, in order to find the geometry yielding maximum scattering of light, or, in other words, haze, possible from the coating. If there is no geometry that can make haze observable, an A+ rating is assigned to the sample. Very poor samples receive D−. For purposes of numerical analysis, the letter grades are given values of 5 to 60, as described above for the shear test. Lower haze corresponds to higher numerical values.

The particular film, or layer, thicknesses used in this example influence the color and emissivity of the final product. But, choice of thickness is also influenced by manufacturing issues. The thicknesses of the dielectric layers and silver can be modified to obtain a large pallet of colors. Thickness of the titanium primer is limited by its effect on protection of the silver layer during the deposition process, on coating hardness (shear resistance) and on haze, as will become apparent in the EXAMPLES ON EFFECT OF PRIMER THICKNESS, as set forth below. The thickness of the titanium dioxide overcoat should exceed a minimum, in order to impart the desired chemical durability to the stack, but is limited on the upper side by its low rate of deposition and manufacturing economics.

While this EXAMPLE uses only one layer of silver, it is understood that its principles can be built upon to provide a heatable glass coating with multiple silver films. An example of this is a coated article of the following sequence: glass sheet substrate|oxide of zinc-tin alloy|oxide of zinc|silver|titanium|oxide of zinc-tin alloy|oxide of zinc|silver|titanium|oxide of zinc-tin alloy|an exterior protective film of oxide of titanium.

EXAMPLE 2

Large plates of coated glass similar to that of EXAMPLE 1 were successfully shipped to a tempering plant in another state, using the same packaging and shipping methods used for other low-emissivity coated glass products, and tempered on a continuous electric tempering line. At the tempering plant, the glass was cut to size, seamed with an automatic seamer, washed in a flat glass washer using deionized water, and dried with clean compressed air. "Seaming" is a sanding of the edges of glass to remove microcracks which would propagate during the tempering process. The glass then traveled through the lehr of the line at constant speed and was air quenched upon exiting the lehr. The glass was subsequently washed a second time in preparation for installation in an insulated glass window unit. The properties of the coated glass after the above treatment were comparable to those listed in EXAMPLE 1 for the heated coated glass specimen. The coating was durable enough for the interstate shipping and for the cutting, seaming and washing steps before the tempering process.

EXAMPLES ON EFFECT OF PRIMER THICKNESS

A series of samples were prepared and tested experimentally to determine the effect of the thickness of the titanium primer film on shear resistance, visible light transmission (VLT), and sheet electrical resistance. The samples were prepared in the same manner as the sample of EXAMPLE 1 described above, with the following exceptions. First, the silver layer thickness was set at 90 Angstroms (calculated from the measured 9.5 $\mu g/cm^2$) as opposed to the 115 Angstrom thick layer of EXAMPLE 1. Second, while all samples received a zinc stannate film on the substrate, only a portion of the samples received a zinc oxide film over the zinc stannate film before deposition of the silver layer, thus creating a set of zinc stannate metal-contact film-part samples and a set of zinc oxide metal-contact film-part samples. The titanium primer layer thickness was then varied for each of these two sets and the remaining layers were deposited as described in EXAMPLE 1. The test parameters were otherwise as set forth in EXAMPLE 1.

FIGS. 1A and 2A are plots of the effect of variations in titanium thickness on the shear resistance, visible light transmission and electrical resistance of the amorphous zinc stannate metal-contact film-part samples. FIGS. 1B and 2B give results of the same tests, but where the crystalline zinc oxide metal-contact film-part samples were used. Data for visible light transmission and electrical resistance are given for both before and after heating to tempering temperature for all samples.

It was found that, shear resistance increases after heating to tempering temperature, but this is not shown in the figures. All of FIGS. 1A through 2B show that shear resistance, also referred to as coating hardness, passes through a minimum at titanium primer thicknesses of about 17 Angstroms.

Transmission increases after heating to tempering temperature, due to oxidation of the primer film and perhaps due to annealing of the reflective metal film, silver.

The beneficial effect of the zinc oxide on electrical resistance, particularly after tempering in the case of the thicker titanium films, is evident by the lower resistance values obtained.

The after-heat samples of both the zinc oxide metal contact film parts and the zinc stannate film parts were tested for haze. FIG. 3 shows the results of the haze rating testing, as determined by the dark room, floodlight haze test. The samples with the zinc oxide metal-contact film-part go through a pronounced peak of desirable high haze rating corresponding to low haze, at about 24 to 28 Angstroms of thickness of the titanium primer layer as shown in FIG. 3.

EXAMPLES ON EFFECT OF METAL-CONTACT FILM-PART THICKNESS

The discovery of the effect of titanium primer film thickness on haze was supplemented with a series of examples wherein samples A through F were prepared where the thickness of a zinc oxide metal-contact film-part over a zinc stannate support film part was varied from 0 Angstroms to 68 Angstroms in thickness while the titanium primer thickness was held constant at 28 Angstroms. The samples and test parameters were otherwise as set forth in EXAMPLE 1. The samples were tested for haze, and the data are presented in Table 1, where the thickness of the zinc oxide metal contact film part is correlated with the after-heat haze rating.

TABLE 1

| | ZINC OXIDE THICKNESS (Å) | HAZE RATING | |
|---|---|---|---|
| Sample A | 68 | A+ | (60) |
| Sample B | 56 | A | (55) |
| Sample C | 45 | A | (55) |
| Sample D | 22 | A | (55) |
| Sample E | 0 | D− | (5) |
| Sample F | 56 | A− | (50) |

These tabulated results agree with the data of FIG. 3 in that the lowest haze rating (and therefore worst haze) corresponds to the Sample E where no zinc oxide was deposited resulting in a zinc stannate metal-contact film-part. The other Samples A through D and F show consistently high haze ratings (low haze levels), which appear from the data in Table 1 to be independent of zinc oxide thickness.

Figure 4B:
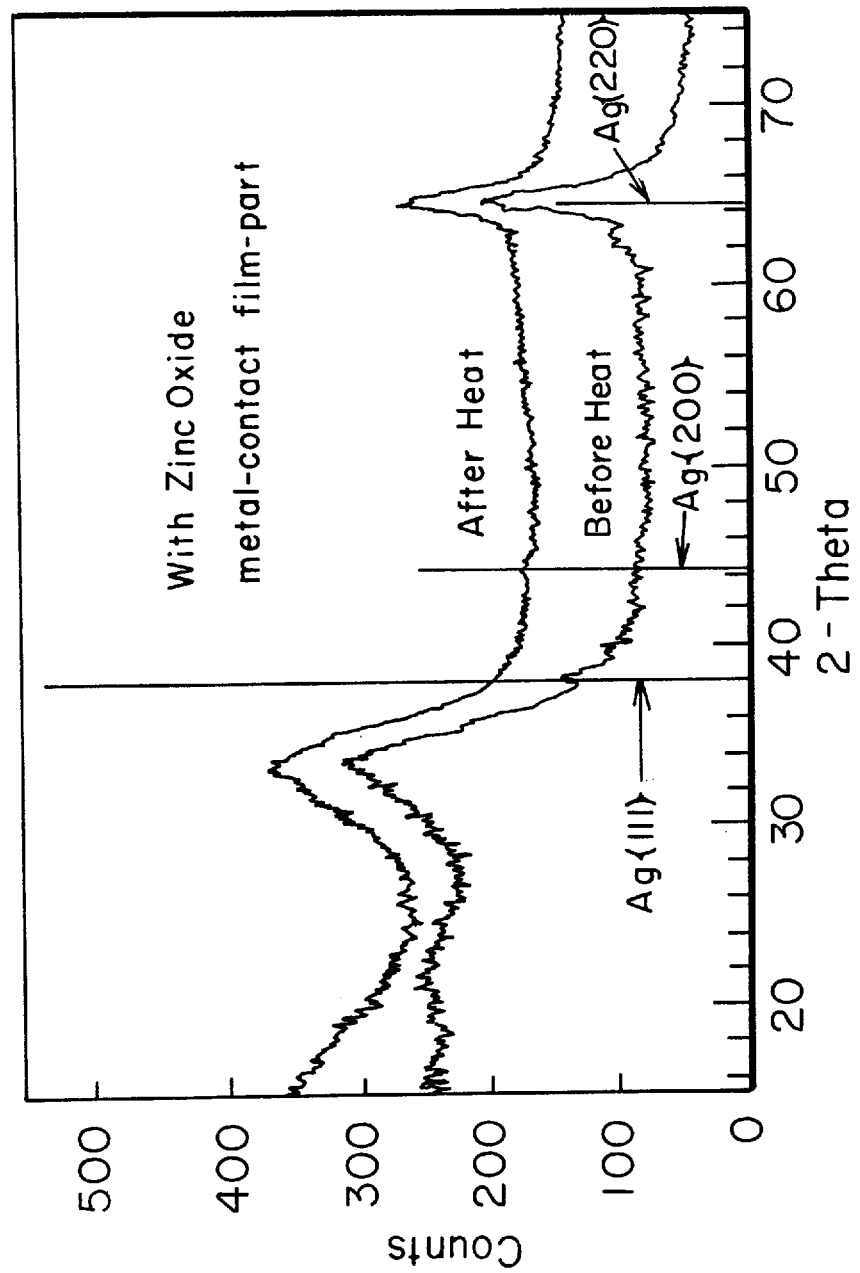
FIG. 4B is a plot which shows the before-heat and after-heat grazing angle x-ray diffraction spectra of the Sample F in Table 1 wherein the zinc oxide metal-contact film-part is present and is in contact with the silver. The spectrum of FIG. 48 is also characteristic of the spectra of Samples A through D in Table 1.

The effect of thickness of the metal-contact film-part on planar indices was tested with Samples E and F of Table 1 by obtaining diffraction spectra of the Samples. FIGS. 4A and 4B correspond to the before-heat and after-heat, diffraction spectra of the Samples E and F of Table 1, respectively.

The x-ray diffraction method used for the spectra presented herein is the grazing-angle method. In this configuration, the x-ray source is directed towards the sample at a fixed, small angle ($\leq 1.0$ degrees), in order to maximize the signal from the thin film coating. The x-ray detector is swept in a vertical plane normal to the sample surface, in order to measure the intensities of the diffracted x-ray peaks. The sample angle relative to the source is kept constant, but the sample rotates in its own plane about its surface normal. For further information on this technique, see T. C. Huang, in "Advances in X-Ray Analysis", Vol. 35, Ed. C. S. Barnett et al., Plenum Press, New York, 1992, p 143.

For a multigrained, or polycrystalline, film with a random orientation, the diffraction pattern, or spectrum, of silver is similar to that of a powder sample, where the {111} peak is most prominent. Table 2 shows the diffraction pattern for silver powder, as taken from the JCPDS-ICDD Powder Diffraction Database.

TABLE 2

JCPDS-ICCD Powder Diffraction Data for Silver

| Silver Plane* | 2-Theta | Relative Intensity |
|---|---|---|
| 111 | 38.117 | 100 |
| 200 | 44.279 | 40 |
| 220 | 64.428 | 25 |
| 311 | 77.475 | 26 |
| 222 | 81.539 | 12 |

*Only Planes up to 2θ value of 85 degrees are shown here.

While the pre-heat, or before heat, spectrum in FIG. 4B corresponds to Sample F, it is also typical of those of the diffraction spectra of Samples A through D as well, but differs considerably from that of FIG. 4A. Comparing pre-heat 4B to pre-heat 4A, the presence of the zinc oxide metal-contact film-part in FIG. 4B reduces the intensity of the peak for the silver close-packed {111} planes but promotes the peak for the {220} planes. Planes, like the {220} planes, which do not have close packing, are referred to herein as "less packed" planes.

The rise of the {220} peak above the {111} peak in to FIG. 4B compared to FIG. 4A is indicative that the thin silver film of FIG. 4B has a preferential crystallographic orientation relative to the substrate, as compared to the more random distribution of grain orientations in FIG. 4A resembling the spectrum which would be obtained from a powder sample. This, however, does not suggest that the {220} planes are parallel to the substrate. In fact, due to the asymmetric x-ray diffraction geometry described above, the {220} planes are at an angle relative to the plane of the substrate.

Comparing the post-heat, or after heat, spectra, it will be noted that the sample of FIG. 4B with the zinc oxide metal-contact film-part continues to show a {220} peak, while exhibiting essentially no {111} peak. Thus, the preferential orientation of the pre-heat zinc oxide sample has been retained even after heating. In the sample of FIG. 4A, without a zinc oxide metal-contact film-part, while a {220} peak has developed after heating, the {111} peak towers above it, indicating retention of an essentially random grain orientation.

The shapes of these spectra are specific to the diffraction geometry described above. Other diffraction geometries will yield spectra, which while different in appearance, still indicate preferred grain orientation for the zinc oxide samples.

EXAMPLES ON EFFECT OF TWO VARIABLES

Figure 5B:
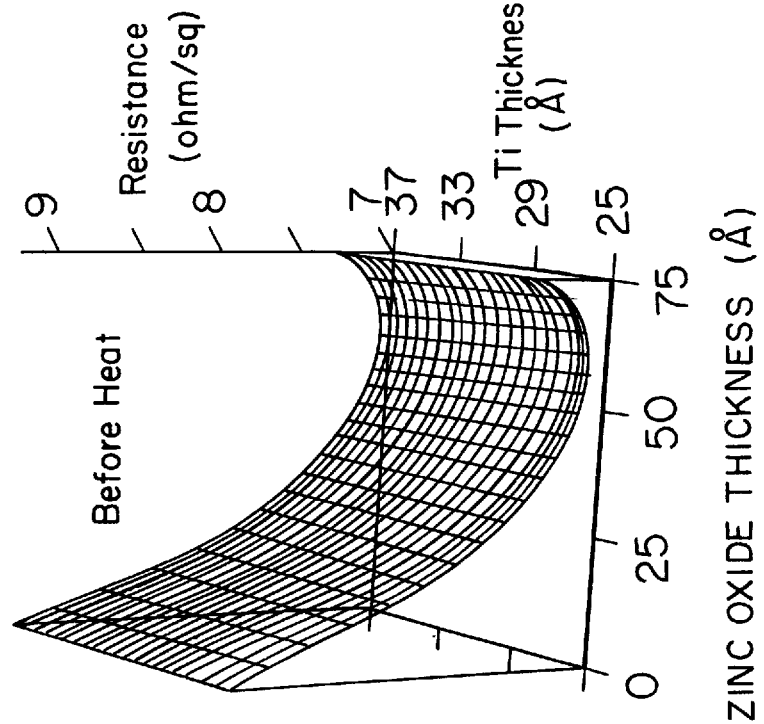
FIG. 5B is a surface plot of the two-variable experiment of FIG. 5A, showing the after-heat results.
Figure 5A:
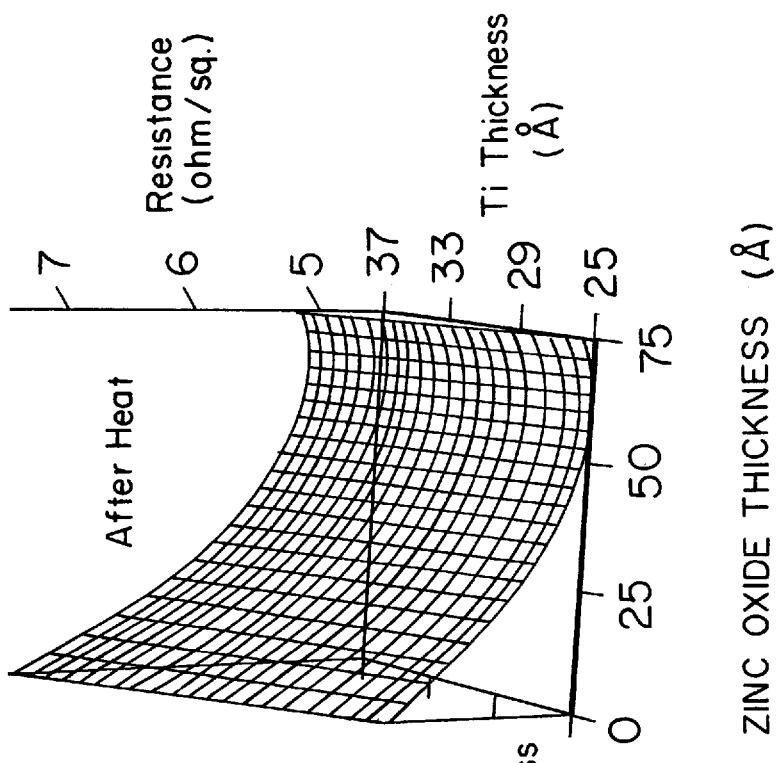
FIG. 5A is a surface plot of results of a before-heat two-variable designed experiment that shows the effect on coating electrical resistance of varying thickness of a zinc oxide metal-contact film-part and varying thickness of the titanium primer film.

A two-variable designed experiment was conducted to show the effect of varying thicknesses of a zinc oxide metal-contact film-part and a titanium primer film on coating resistance before and after heat treatment. A set of 22 samples were prepared as set forth in EXAMPLE 1, except that the zinc oxide metal-contact film parts and titanium primer layer thicknesses were varied to provide a randomized set of trials for a designed experiment. All other experimental conditions were as set forth in EXAMPLE 1, except silver film thickness which was held constant at $9.95 \pm 0.22$ $\mu g/cm^2 = 95 \pm 2$ Angstroms (based on density calculations) as opposed to the 115 Angstrom thick silver layer of EXAMPLE 1. The experimental results were processed in a commercially-available statistical computer program to provide the plotted surfaces of FIGS. 5A and 5B.

EXAMPLES ON EFFECT OF THE COMPOSITION OF THE METAL-CONTACT FILM-PART AND DEPOSITION OXYGEN CONCENTRATION ON PLANAR INDICES FORMATION, RESISTANCE AND EMISSIVITY

Four samples were prepared and tested to demonstrate the effects of: 1) oxygen concentration during deposition of a zinc oxide metal-contact film-part; and 2) to demonstrate the effect of the composition of the metal-contact film-part—specifically whether it was comprised of crystalline zinc oxide with strong preferred orientation, crystalline zinc oxide without strong preferred orientation, or whether it was comprised of amorphous zinc stannate. The Samples G through J were prepared as set forth in FIG. 9. Cast metal cathode targets were used. Grazing-angle diffraction spectra for Samples G through J are presented in FIGS. 6A–6D respectively. The spectra are for the coatings of FIG. 9 before any heating such as for tempering. Resistivity and emissivity were also measured and are set forth in FIG. 9. It is to be noted that FIG. 9 provides a direct comparison of multilayered films including substrate|zinc oxide|silver formulation (Samples G, H and J) with a multilayered film including substrate|zinc stannate|silver formulation (Sample I) to provide direct comparisons of the metal-contact film-parts without the use of a separate support-part film. It is also to be noted that Sample J is corroborative of Sample H, being prepared under virtually identical circumstances.

Figure 6A:
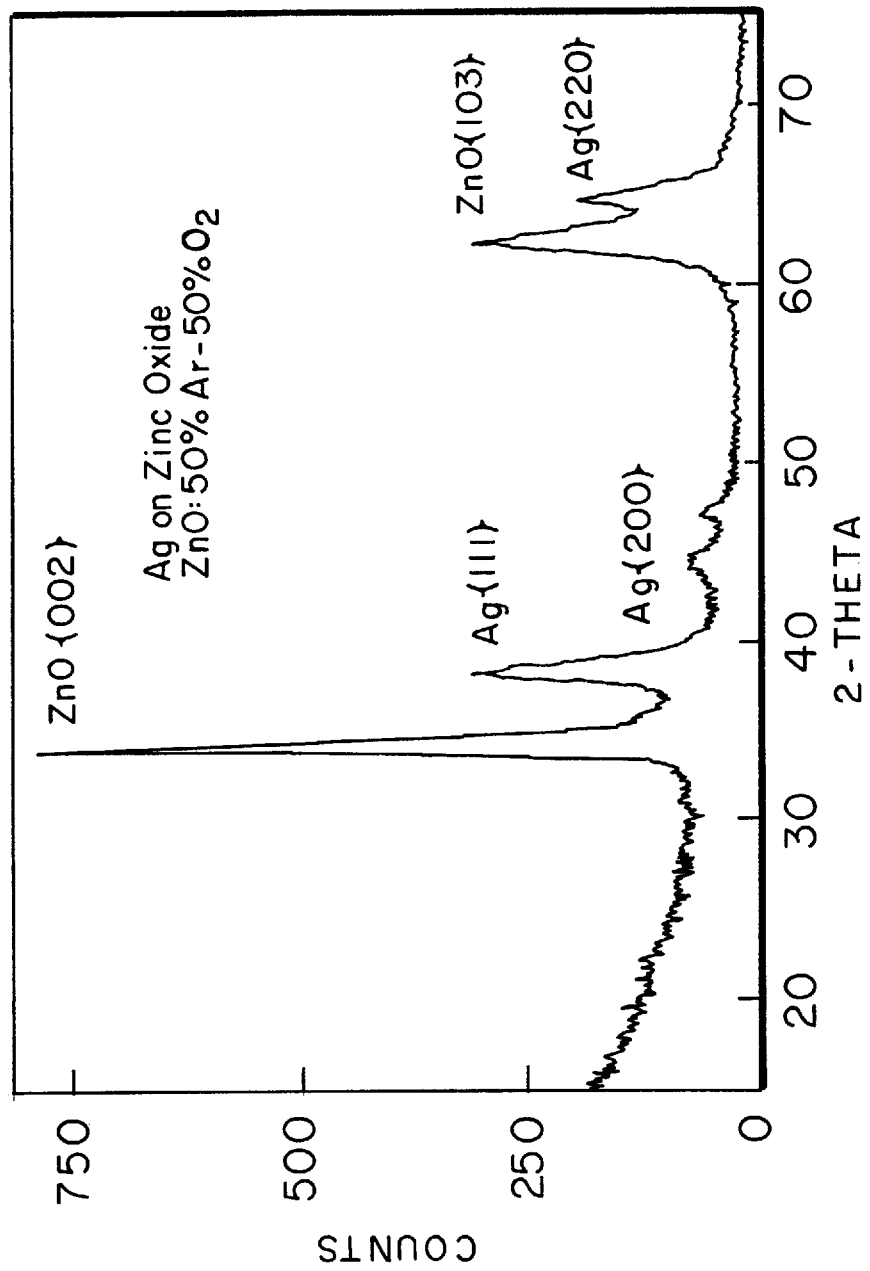
FIG. 6A is a plot of a grazing-angle x-ray diffraction spectrum before heating for Sample G of FIG. 9 showing the effect of oxygen concentration on planar indices formation of a zinc oxide metal-contact film-part deposited in an atmosphere of 50% argon and 50% oxygen.
Figure 6B:
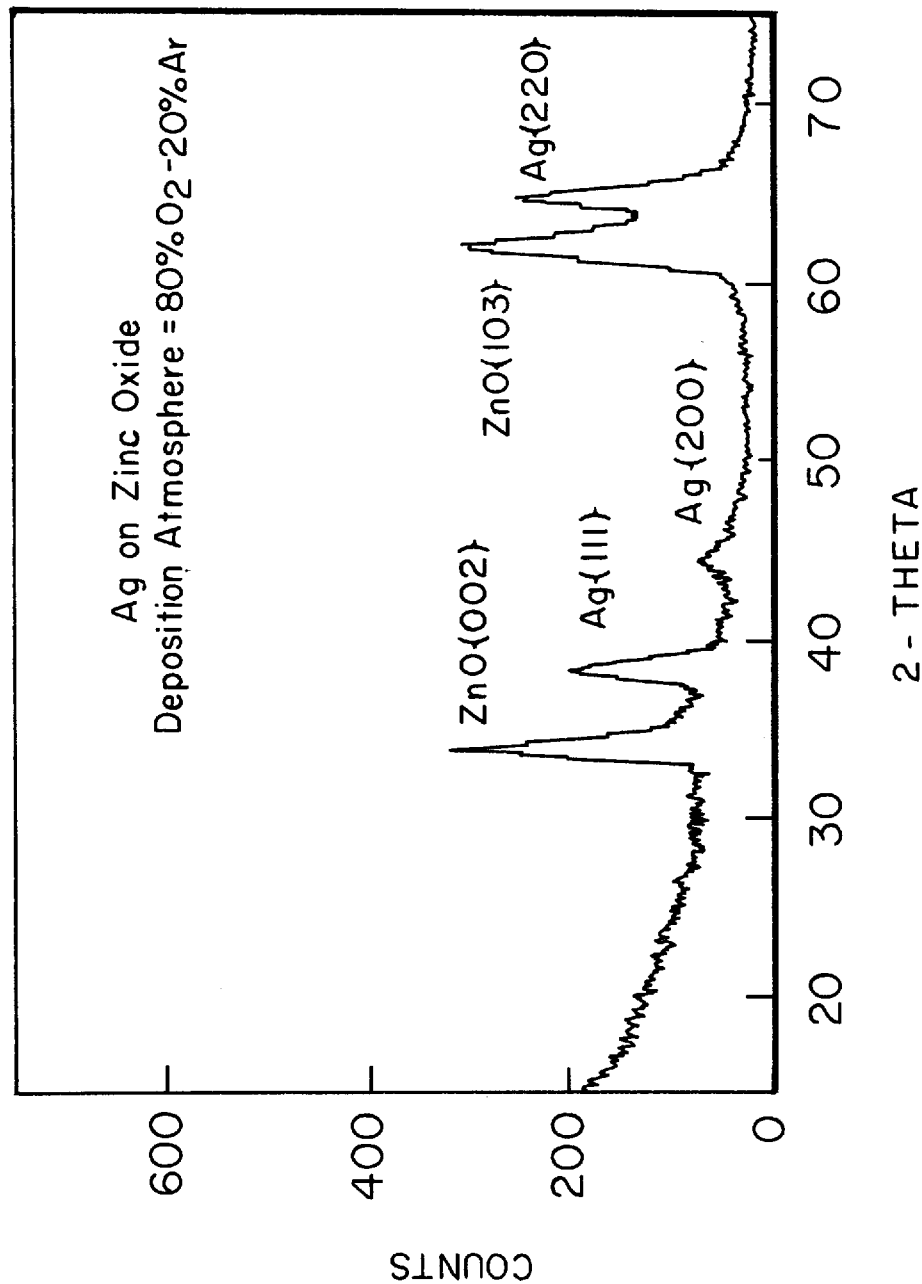
FIG. 6B is a plot of a grazing-angle x-ray diffraction spectrum before heating for Sample H of FIG. 9 showing the effect of oxygen concentration on planar indices formation of a zinc oxide metal-contact film-part deposited in an atmosphere of 80% oxygen and 20% argon.
Figure 6C:
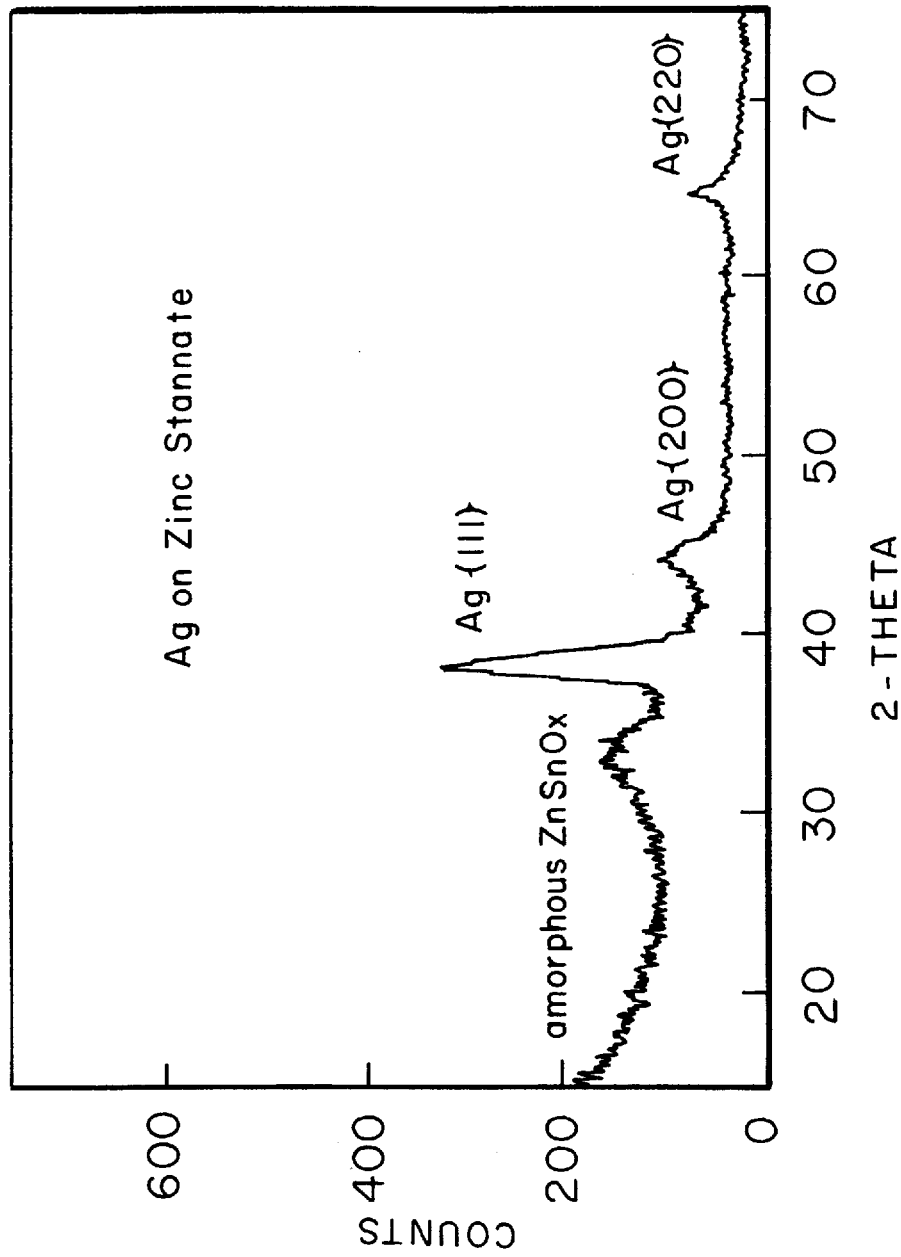
FIG. 6C is a plot of a grazing-angle x-ray diffraction spectrum before heating for Sample I of FIG. 9 showing the effect of an amorphous metal-contact film-part on planar indices formation of a zinc stannate metal contact film part deposited in an atmosphere of 65% oxygen and 35% argon.
Figure 6D:
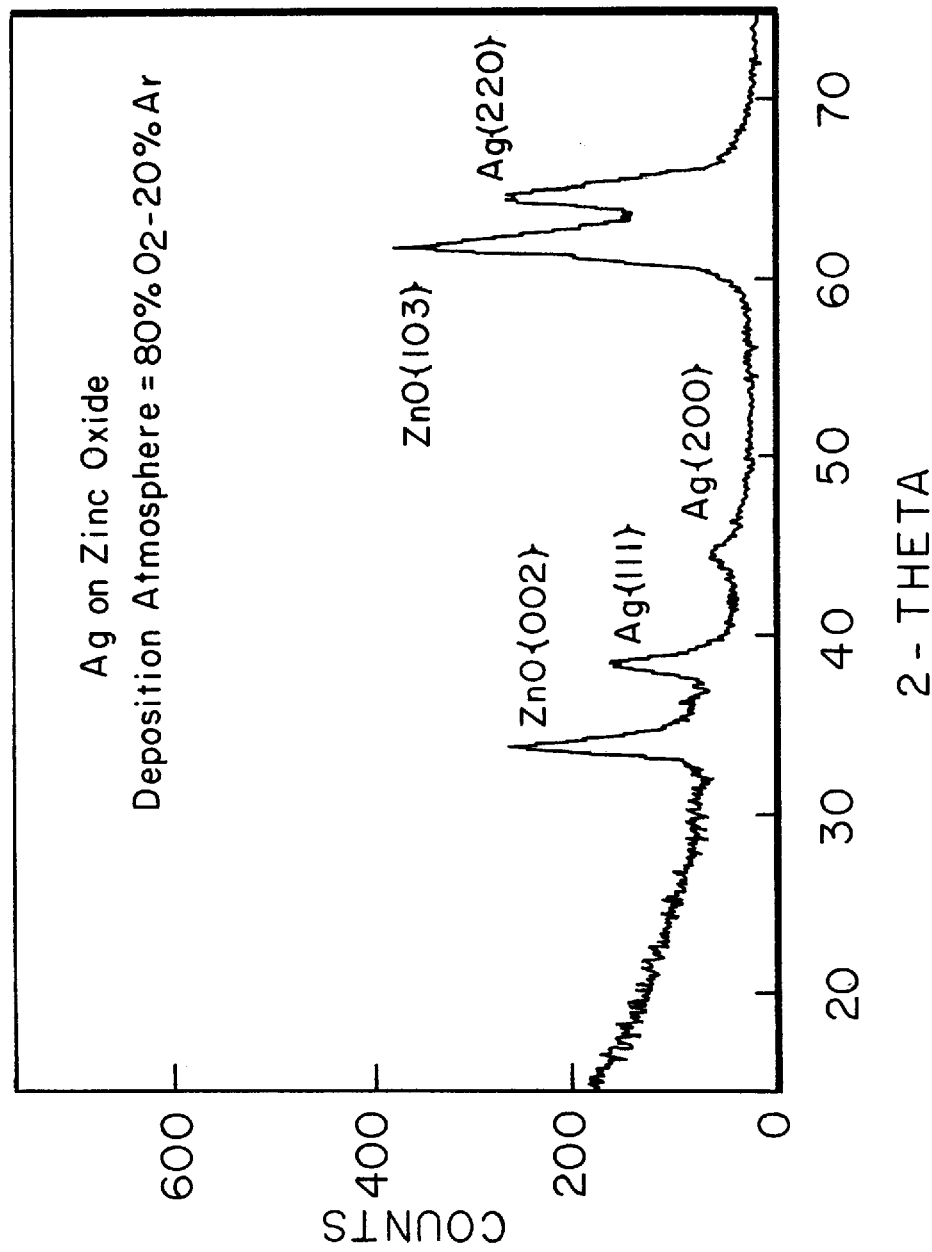
FIG. 6D is a plot of a grazing-angle x-ray diffraction spectrum before heating for Sample J of FIG. 9 which was formed under virtually identical conditions is the plot of FIG. 6B and which confirms the results of the plot of FIG. 6B.

Samples H and J show a low level of electrical film resistance, while Samples G and I show a high electrical film resistance, corresponding to the silver having two different electrical resistance levels. Samples H and J show low resistance and correspond to zinc oxide deposition at a higher, 80% oxygen concentration, and the spectra for these samples are shown in FIGS. 6B and 6D.

At the outset, the results shown in FIG. 9 show that where the metal contact film-part is amorphous zinc stannate, as in Sample I, electrical resistance is clearly higher than in Samples H and J. The inventors have found that varying the oxygen-content of the atmosphere during deposition of the zinc stannate metal-contact film-part has no effect on lowering the resistivity, as the metal-contact film-part has no crystalline-forming or crystalline-directing properties. Thus, neither the composition (zinc stannate) of the metal-contact film part, nor variations in the oxygen concentration during its deposition provide the desired results of the present invention.

In contrast, Samples H and J show significantly lower resistance where a zinc oxide metal-contact film-part is used. These two samples correspond to an oxygen concentration of 80% during the deposition of the zinc oxide metal contact film part. The inventors have also found that varying the oxygen concentration during deposition of the zinc-oxide metal-contact film-part significantly impacts resistance thus demonstrating that silver has two different electrical resistance levels and that a choice of the levels can be obtained by controlling oxygen concentration during deposition of the metal-contact film-part. The foregoing is shown by a comparison of Sample G (zinc oxide metal-contact film-part, 50% $O_2$/50% argon, resistance 3.52 ohms/sq.) versus Samples H and J, (zinc oxide metal contact film part, 80%$O_2$-20%Ar, resistance 2.92 and 2.85 ohms/sq. respectively). Thus both the composition of the metal-contact film-part (zinc oxide versus zinc stannate) and its oxygen concentration during deposition have a significant impact on the resistance of the multilayered films formed.

Tests of the diffractions spectra of Samples G through J confirm that the peaks of the silver {220} planes are higher than the {111} planes for Samples H and J than for Samples G and I. As compared to the patterns of FIGS. 6A (Sample G) and 6C (Sample I), the peaks in FIGS. 6B (Sample H) and 6D (Sample J) for the {220} silver planes are higher than those for the {111} planes. As compared to the pattern of FIG. 6A, the peaks for the {103} zinc oxide planes in FIGS. 6B and 6D are higher than in FIG. 6A. It appears that a zinc oxide metal-contact film-part deposited at the higher, 80% oxygen concentration has a different crystalline character which causes the grains of the subsequently deposited silver films to orient preferentially in the form having the lower electrical resistance level.

The rise of the {103} peak of zinc oxide over its other lower index peaks in FIGS. 6B and 6D is in contrast to the powder diffraction pattern of zinc oxide, as shown in Table 3 below. This behavior is similar to the case for silver, as described above, and indicates a preferential growth of the zinc oxide film with the {103} planes at an inclination relative to the plane of the substrate. This preferential orientation of the zinc oxide film causes the preferential growth of silver above it, which, in turn, results in better electrical conductivity within the metallic film. These observations have been supported by high resolution transmission electron microscopy analyses.

As discussed above, the shapes of these spectra are specific to the particular diffraction geometry used in these experiments.

TABLE 3

JCPDS-ICDD Powder Diffraction Data for Zinc Oxide

| Zincite Plane* | 2-Theta | Relative Intensity |
| --- | --- | --- |
| 100 | 31.770 | 57 |
| 002 | 34.442 | 44 |
| 101 | 36.253 | 100 |
| 102 | 47.539 | 23 |
| 110 | 56.603 | 32 |
| 103 | 62.864 | 29 |
| 200 | 66.380 | 4 |
| 112 | 67.963 | 23 |
| 201 | 69.100 | 11 |
| 004 | 72.562 | 2 |
| 202 | 76.995 | 4 |
| 104 | 81.370 | 1 |

*Only Planes up to a 2θ value of 85-degrees are shown here.

FURTHER EXAMPLES USING X-RAY SPECTRA

A series of samples were prepared and tested to demonstrate further the reversal of the intensities of the silver {111} and {220} planes for a zinc oxide metal-contact film-part of the invention compared to an amorphous zinc stannate metal contact film-part for silver layers of varying thickness. These comparisons were conducted without the use of a separate support film part as explained above. The zinc oxide metal contact film part samples were prepared by depositing zinc oxide on the substrate in a 20%–80% argon-oxygen atmosphere, which as noted above, results in the preferential growth of {220} planes of silver. The zinc stannate metal contact film part samples were prepared by depositing zinc stannate on a substrate in a 65%$O_2$/35Ar atmosphere which as noted above results in no preferential growth of {220} planes of silver. Both sets of examples were then coated with silver layers of varying thickness, and peak intensities were determined via x-ray diffraction. The results are shown in FIGS. 7A and 7B. Using regression analysis, a second order polynomial was fitted to the data, and these corresponding curves are also shown in FIGS. 7A and 7B. The results shown in FIGS. 7A and 7B demonstrate that in samples lacking the zinc oxide metal-contact film-part (FIG. 7A), the silver {111} planes dominate the diffraction spectrum, while, with the zinc oxide metal-contact film-part present (FIG. 7B), the {220} planes become the primary peak. This behavior continues up to silver film thicknesses of 500 Angstroms, or more. That is, the structure of the initial nucleation layer of silver has a pronounced effect on the growth of the silver film as it develops into a significantly thicker layer.

EXAMPLES ON RESISTIVITY VERSUS SILVER THICKNESS

A series of samples were prepared and tested to show that the metal-contact film-part of the present invention places silver in a lower resistance form at silver film thicknesses of interest for high transmittance, low emissivity coated glasses. The samples were prepared in the same manner and in the same deposition atmospheres as the samples of FIGS. 7A and 7B to provide a set of zinc oxide metal-contact film-part samples and a set of zinc stannate metal-contact film-part samples, with the exception that the zinc oxide metal-contact film-part samples were subdivided into a first subset prepared with a 1.5 inch (3.8 cm) cathode-to-substrate spacing and a second subset with a 5.5 inch (13.97 cm) cathode-to-surface spacing to also test whether such spacing affected resistivity. All samples were then overcoated with silver layers of varying thickness and resistance was measured.

Figure 8:
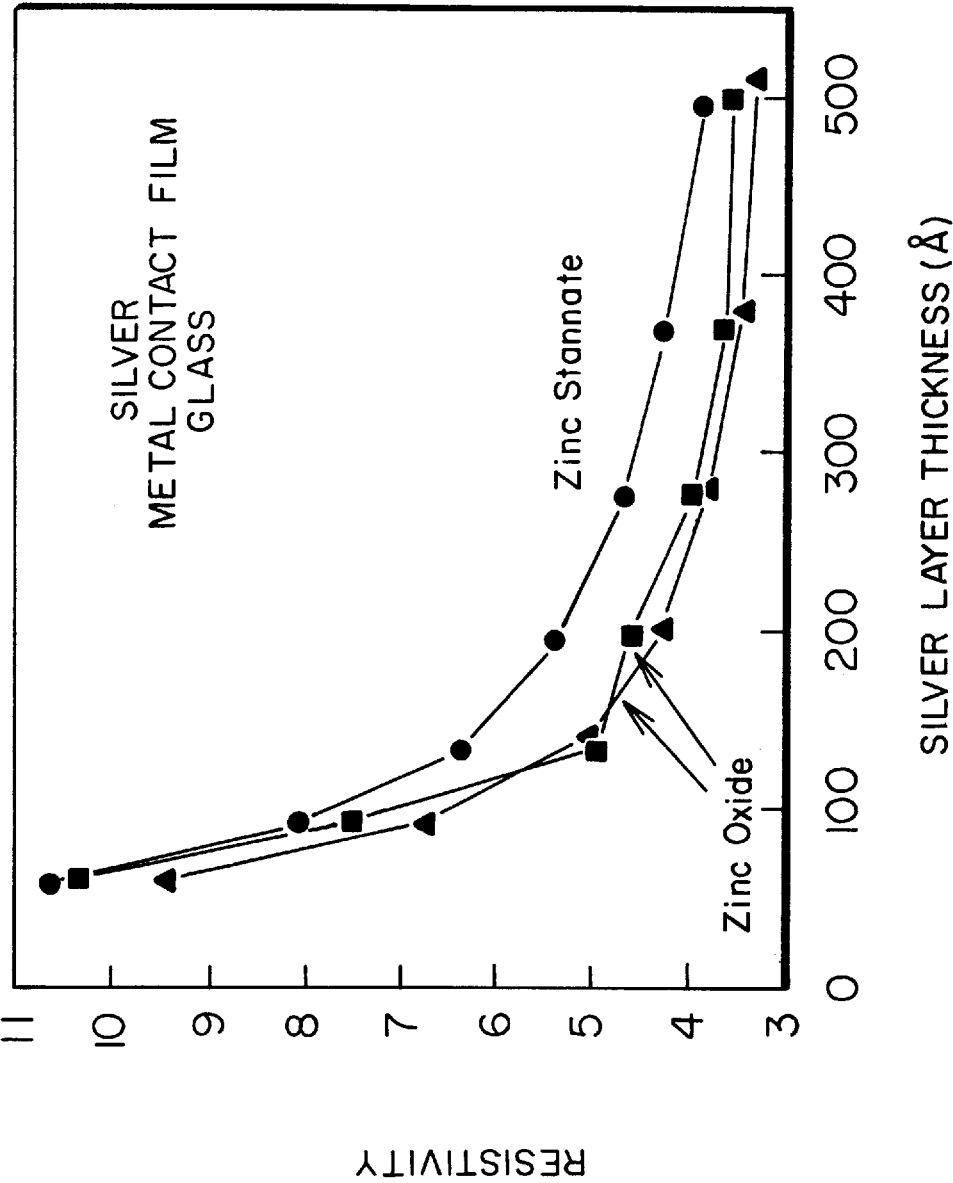
FIG. 8 is a plot of resistivity versus silver layer thickness for a zinc stannate metal-contact film part and for a pair of zinc oxide metal-contact film parts.

The results are shown in FIG. 8, expressed in terms of film resistivity versus silver thickness.

Resistivity of bulk materials is independent of the sample size. For these samples with the thin silver films, however, film resistivity is quite high until the thickness exceeds 50 Angstroms, or more. At lower thicknesses, the film is discontinuous and in the form of isolated islands or of a very rough morphology and, thus, resistance is high. All curves fall as silver thickness increases and appear to approach a thick film resistivity value. This is due to the increasing effect of the bulk properties of the silver. With the present invention, the resistivity curves for both of the zinc oxide metal contact film part samples are shifted to a lower level than the curve for the zinc stannate metal-contact film-part samples. The largest differences correspond to a silver thickness of 80–200 Angstroms, which is most significant to the field of high transmission, low emissivity coatings.

EXAMPLE 3

Untempered Double Stack

A multiple layer coating was deposited on a substrate in the form of a 2.5 mm (0.098 inch) thick pane of clear, annealed, soda-lime glass. The coater, and its operation, have already been described in EXAMPLE 1. The coating in this Example was formed by first depositing a 320 Angstrom dielectric base film consisting of a support film-part of amorphous zinc stannate contiguous to the glass substrate and a metal-contact film-part of crystalline zinc oxide layer on the zinc stannate. The relative thicknesses of the two film-parts of this base film were as in EXAMPLE 1.

Next, a layer of silver film was deposited on the crystalline zinc oxide. The thickness of the silver film was equivalent to 9.5 $\mu g/cm^2$ of silver (XRF), which corresponds to approximately 90 Angstroms of a film with silver's bulk density.

Next, a sacrificial titanium primer film with a thickness equivalent to 0.4 $\mu g/cm^2$ (corresponding to a thickness of about 9 Angstroms of a film with the bulk density of titanium) was deposited on the top of the silver.

The deposition of these metal films was followed by deposition of an approximately 805 Angstroms three part antireflecting dielectric base film. This three part base film consisted of a zinc oxide|zinc stannate|zinc oxide film-part sequence with an approximate 26%/35%/39% thickness ratio. Here, the zinc oxide|zinc stannate sequence is the support film-part, and the top zinc oxide, representing 39% of the thickness, is the metal-contact film-part destined to receive a second silver film of the coating as described below.

It is to be noted that the zinc oxide film is thicker in the metal-contact film-part (39%) than the zinc oxide film in the support film-part (26%) in this example, due only to manufacturing limitations of the equipment used to deposit the films. The resulting coating was still sufficiently chemically, though not thermally, durable. However, as noted above, it remains advantageous to minimize the thickness of the zinc oxide film in the metal-contact film-part, provided it can still cause the low resistive reflective metal film to form as described above.

A second reflective film of silver was then deposited on the top of the dielectric composite film. This second layer had an equivalent thickness of 130 Angstroms as derived from a measured value of 13.4 $\mu g/cm^2$ of silver in a separate experiment.

A sacrificial titanium primer layer with a thickness equivalent to 0.45 $\mu g/cm^2$ (corresponding to a thickness of about 10 Angstroms of a film with the bulk density of titanium) was deposited on the top of the second silver film.

Next, a 270 Angstrom antireflective film, consisting of a first zinc oxide film-part deposited over the primer layer and a second zinc stannate film part deposited over the first zinc oxide film part with a 40%/60% thickness ratio was deposited.

This antireflective layer was followed by a final, approximately 30 Angstrom thick, titanium dioxide overcoat.

The coating of this EXAMPLE 3 passed the shear resistance test by receiving a rating of 60. It had a sheet resistance of 2.23 $\Omega$/sq. and an emissivity of 0.05, or lower.

The visible transmittance of this sample was 81.6% and its visible reflectance was equivalent to Y(D65)=4.75 on its coated side. The coated side CIE 2° observer color coordinates of this sample were x=0.3088 and y=0.3461.

As in EXAMPLE 1, the choice of the above silver and dielectric layer thicknesses is based on the desired color and emissivity of the product, as well as on manufacturing related issues. By adjusting thicknesses in any of the three dielectric layers and the two silver layers, it is possible to produce an entire pallet of colors. The goal in this EXAMPLE was to produce a relatively neutral appearing color.

The maximum thickness of the titanium primer is limited by its effect on coating hardness and optics as described elsewhere, and its minimum thickness is determined by its degree of effectiveness in protecting silver during the multilayer deposition process. Since the coated product of this example is not intended for tempering, lesser thickness of titanium primer is needed than in EXAMPLE 1. Limits on the thickness of the titanium dioxide overcoat as described in EXAMPLE 1 apply to this example as well.

EXAMPLE 4

Zinc-Aluminum Oxide Metal Contact Film Part

The coating of this example was deposited on a 12 inch×12 inch (30.48 cm×30.48 cm) clear float glass substrate using an Airco ILS1600 coater. The coating consisted of the following layer sequence: glass|zinc-tin oxide|zinc-aluminum suboxide|silver titanium|zinc-tin oxide|titanium oxide. Pressure was maintained at 4 mTorr during the deposition of all layers of this coating.

The support film-part contiguous to the glass substrate was sputtered in a 65%$O_2$-35%Ar atmosphere by multiple passes of the substrate under a tin-zinc alloy target at 2 kW of power. Total thickness of the resulting zinc stannate was approximately 390 Angstroms.

The metal-contact film-part was sputtered from a zinc-aluminum oxide ceramic target in a pure Ar atmosphere at 0.2 kW of power. This method of sputtering results in a partially reduced layer of zinc-aluminum oxide that is less transparent than a fully oxidized layer of similar thickness. The thickness of this layer was approximately 75 Angstroms, but other thicknesses were also used with the similar results (e.g., 15–100 Angstroms).

The silver and titanium films were also sputtered in pure argon atmospheres and were approximately 130 Angstroms and 21 Angstroms thick, respectively.

The zinc stannate above the titanium primer was deposited in the same manner as the first zinc stannate layer and had a similar thickness.

Finally, the titanium oxide overcoat was deposited reactively in a 65%$O_2$-35%Ar atmosphere using multiple passes of the substrate under a titanium target at 6.5 kW of power. The thickness of this layer was approximately 45 Angstroms.

This coating passed the shear resistance test, and had a low post-temper haze. As a result of tempering, its transmission increased from 76.6% to 84% and its resistance went from 5.3 ohm/sq to 3.8 ohm/sq., while its emissivity decreased, from an initial value of 0.09, to 0.07.

The above examples are offered to illustrate the present invention. Various modifications are included.

For example, other coating compositions are within the scope of the present invention. Depending on the proportions of zinc and tin when a zinc/tin alloy is sputtered, films of oxide of zinc and tin may deviate significantly from exact stoichiometry of zinc stannate (i.e., deviations from a 2:1 Zn:Sn atom ratio). While deposited as titanium metal, after deposition the primer layers may comprise titanium metal in various states of oxidation. In the claims which follow, the titanium thicknesses, as given, are referenced to the XRF method, as described above, in order that thickness variations due to varying degrees of oxidation are factored out. Other metals such as zirconium and chromium are also useful as primers in accordance with the present invention.

The thicknesses of the various layers are limited primarily by the desired optical properties such as transmittance, emissivity or color.

Process parameters such as pressure and concentration of gases may be varied over a broad range, as long as the intended structures of each layer, as described in the body of this text, are realized.

Protective coatings of other chemically resistant materials may be deposited as either metal or oxides.

Other metal-contact films, i.e. other materials or same materials in other forms, that promote a preferentially (as opposed to randomly) oriented growth of the crystal grains within the silver film may also be used.

Thus, it is to be understood that the above are preferred modes of carrying-out the invention and that various changes and alterations can be made without departing from the spirit and broader aspects of the invention as defined by the claims set forth below and by the range of equivalency allowed by law.

What is claimed is:

1. A high transmittance, low emissivity coated article comprising:
    a. a transparent, nonmetallic substrate;
    b. a dielectric, antireflective base film overlying the substrate, the base film including a zinc-tin oxide support film-part overlying the substrate and a crystalline metal-contacting film-part selected from the group consisting of indium tin oxide, zinc-aluminum oxide, zinc oxide and mixtures thereof overlying the support film-part;
    c. a metallic reflective film deposited on the crystalline metal-contacting film-part of the base film, the metallic film having two levels of electrical resistivity, one level being lower than the other;
    d. a primer film overlying the metallic reflective film; and
    e. a dielectric, antireflective film overlying the primer film;

wherein the metal-contacting film-part directs said metallic film to the lower of said two levels.

2. A coated article as claimed in claim 1 further comprising an exterior protective overcoat layer overlying the dielectric antireflective film.

3. A coated article as claimed in claim 2 wherein the transparent, nonmetallic substrate is glass, the support film-part is a zinc stannate film, the crystalline metal-contacting film-part is a zinc oxide film, the metallic reflective film is a silver film, the primer film is deposited as titanium metal having a thickness in the range of about 22 to 30 Angstroms, the dielectric, antireflective film is a zinc stannate film, and the exterior protective overcoat layer is a titanium oxide film.

4. A high transmittance, low emissivity coated article comprising:
    a. a transparent, nonmetallic substrate;
    b. a first dielectric, antireflective base film overlying the substrate, the first base film including a zinc-tin oxide support film-part overlying the substrate and a crystalline metal-contacting film part selected from the group consisting of indium tin oxide, zinc-aluminum oxide and zinc oxide overlying the support film-part;
    c. a first metallic reflective film deposited on the crystalline metal-contacting film-part of the first base film, the metallic film having two levels of electrical resistivity, one level being lower than the other;
    d. a first primer film overlying the first metallic reflective film;
    e. a second dielectric, antireflective base film overlying the first primer film, the second base film including a zinc-tin oxide support film-part overlying the first primer film and a crystalline metal-contacting film-part selected from the group consisting of indium tin oxide, zinc aluminum oxide and zinc oxide overlying the support film-part;
    f. a second metallic reflective film deposited on the crystalline metal-contacting film-part of the second base film, the metallic film having two levels of electrical resistivity, one level being lower than the other;
    g. a second primer film overlying the second metallic reflective film; and
    h. a dielectric, antireflective film overlying the second primer film;

wherein the metal-contacting film-part of the first base film directs the first metallic film to the lower of said two levels and the metal-contacting film-part of the second base film directs the second metallic film to the lower of said two levels.

5. A coated article as claimed in claim 4 further comprising an exterior protective overcoat layer overlying the dielectric, antireflective film.

6. A coated article as claimed in claim 5 wherein the transparent, nonmetallic substrate is glass, the support film-part of the first base film is a zinc stannate film, the crystalline metal-contacting film-part of the first base film is a zinc oxide film; the first metallic reflective film is a silver film, the first primer film is deposited as titanium metal having a thickness of 22 to 30 Angstroms, the support film-part of the second base film is a zinc stannate film, the crystalline metal-contacting film-part of the second base film is a zinc oxide film, the second metallic reflective film is a silver film, the second primer film is deposited as titanium metal having a thickness of 22 to 30 Angstroms, the dielectric, antireflective film deposited on the second primer film is a zinc stannate film, and the exterior protective overcoat layer is a titanium oxide film.

7. A high transmittance, low emissivity coated article comprising:
   a. a transparent, nonmetallic substrate;
   b. a first dielectric, antireflective base film overlying the substrate, the first base film including a zinc-tin oxide support film-part overlying the substrate and a crystalline metal-contacting film-part selected from the group consisting of indium tin oxide, zinc-aluminum oxide and zinc oxide overlying the support film-part;
   c. a first metallic reflective film deposited on the crystalline metal-contacting film-part of the first base film, the metallic film having two levels of electrical resistivity, one level being lower than the other;
   d. a first primer film overlying the first metallic reflective film;
   e. a second dielectric, antireflective base film overlying the first primer film, the second base film including a crystalline metal-contacting film-part selected from the group consisting of indium tin oxide, zinc aluminum oxide and zinc oxide overlying a support film-part, wherein the support film-part is further comprised of a first layer of a zinc oxide film overlying the first primer film and a second layer of a zinc stannate film overlying the first layer of said support film-part;
   f. a second metallic reflective film deposited on the crystalline metal-contacting film-part of the second base film, the metallic film having two levels of electrical resistivity, one level being lower than the other;
   g. a second primer film overlying the second metallic reflective film; and
   h. a dielectric, antireflective film overlying the second primer film wherein the dielectric, antireflective film includes a first layer of a zinc oxide film overlying the primer film and a second layer of a zinc stannate film overlying the first zinc oxide layer of the dielectric, antireflective film;
wherein the metal-contacting film-part of the first base film directs the first metallic film to the lower of said two levels and the metal-contacting film-part of the second base film directs the second metallic film to the lower of said two levels.

8. A coated article as claimed in claim 7 further comprising an exterior protective overcoat layer overlying the dielectric antireflective film.

9. A coated article as claimed in claim 8 wherein the transparent, nonmetallic substrate is glass, the support film-part of the first base film is a zinc stannate film, the crystalline metal-contacting film-part of the first base film is a zinc oxide film, the first metallic reflective film is a silver film, the first primer film is deposited as titanium metal having a thickness of 8 to 12 Angstroms, the second metallic reflective film is a silver film, the second primer film is deposited as titanium metal having a thickness of 8 to 12 Angstroms, and the exterior protective overcoat layer is a titanium oxide film.

10. A method for making a high transmittance, low emissivity coated article comprising the steps of:
   a. selecting a transparent, nonmetallic substrate;
   b. depositing a dielectric, antireflective base film over the substrate, the base film including a zinc-tin oxide support film-part overlying the substrate and a crystalline metal-contacting film-part selected from the group consisting of indium tin oxide, zinc-aluminum oxide and zinc-oxide overlying the support film-part;
   c. depositing a metallic reflective film on the crystalline metal-contacting film-part of the base film, the metallic film having two levels of electrical resistivity, one level being lower than the other;
   d. depositing a primer film over the metallic reflective film; and
   e. depositing a dielectric, antireflective film over the primer film;
wherein the metal-contacting film-part directs said metallic film to the lower of said two levels.

11. A method according to claim 10 further comprising the step of depositing an exterior protective overcoat layer over the dielectric antireflective film.

12. A method according to claim 11 wherein the transparent, nonmetallic substrate is glass, the support film-part is a zinc stannate film, the crystalline metal-contacting film-part is a zinc oxide film, the metallic reflective film is a silver film, the primer film is deposited as titanium metal having a thickness of 22 to 30 Angstroms, the dielectric, antireflective film is a zinc stannate film, and the exterior protective overcoat layer is a titanium oxide film.

13. A method for making a high transmittance, low emissivity coated article comprising the steps of:
   a. selecting a transparent, nonmetallic substrate;
   b. depositing a first dielectric, antireflective base film over the substrate, the first base film including a zinc-tin oxide support film-part overlying the substrate and a crystalline metal-contacting film-part selected from the group consisting of indium tin oxide, zinc aluminum oxide and zinc oxide overlying the support film-part;
   c. depositing a first metallic reflective film on the crystalline metal-contacting film-part of the first base film, the metallic film having two levels of electrical resistivity, one level being lower than the other;
   d. depositing a first primer film on the first metallic reflective film;
   e. depositing a second dielectric, antireflective base film over the first primer film, the second base film including a zinc-tin oxide support film-part overlying the first primer film and a crystalline metal-contacting film-part selected from the group consisting of indium tin oxide, zinc-aluminum oxide and zinc oxide overlying the support film-part;
   f. depositing a second metallic reflective film on the crystalline metal-contacting film-part of the second base film, the metallic film having two levels of electrical resistivity, one level being lower than the other;
   g. depositing a second primer film over the second metallic reflective film; and
   h. depositing a dielectric, antireflective film over the second primer film;
wherein the metal-contacting film-part of the first base film directs the first metallic film to the lower of said two levels and the metal-contacting film-part of the second base film directs the second metallic film to the lower of said two levels.

14. A method according to claim 13 further comprising the step of depositing an exterior protective overcoat layer over the dielectric, antireflective film.

15. A method according to claim 14 wherein the transparent, nonmetallic substrate is glass, the support film-part of the first base film is a zinc stannate film, the crystalline metal-contacting film-part of the first base film is a zinc oxide film; the first metallic reflective film is a silver film, the first primer film is deposited as titanium metal having a thickness of 22 to 30 Angstroms, the support film-part of the second base film is a zinc stannate film, the crystalline metal-contacting film-part of the second base film is a zinc oxide film, the second metallic reflective film is a silver film, the second primer film is deposited as titanium metal having a thickness of 22 to 30 Angstroms, the dielectric, antireflective film deposited on the second primer film is a zinc stannate film, and the exterior protective overcoat layer is a titanium oxide film.

16. A method for making a high transmittance, low emissivity coated article comprising the steps of:
   a. selecting a transparent, nonmetallic substrate;
   b. depositing a first dielectric, antireflective base film over the substrate, the first base film including a zinc-tin oxide support film-part overlying the substrate and a crystalline metal-contacting film-part selected from the group consisting of indium tin oxide, zinc-aluminum oxide and zinc oxide overlying the support film part;
   c. depositing a first metallic reflective film on the crystalline metal-contacting film-part of the first base film, the metallic film having two levels of electrical resistivity, one level being lower than the other;
   d. depositing a first primer film over the first metallic reflective film;
   e. depositing a second dielectric, antireflective base film over the first primer film, the second dielectric antireflective base film including a crystalline metal-contacting film-part selected from the group consisting of indium tin oxide, zinc-aluminum oxide and zinc oxide overlying a support film-part, wherein the support film-part is further comprised of a first layer of a zinc oxide film overlying the first primer film and a second layer of a zinc stannate film overlying the first layer of said support film-part;
   f. depositing a second metallic reflective film on the crystalline metal-contacting film-part of the second base film, the metallic film having two levels of electrical resistivity, one level being lower than the other;
   g. depositing a second primer film over the second metallic reflective film; and
   h. depositing a dielectric, antireflective film over the second primer film wherein the dielectric, antireflective film includes a first layer of a zinc oxide film deposited over the primer film and a second layer of a zinc stannate film deposited on the first zinc oxide layer of the dielectric, antireflective film;

wherein the metal-contacting film-part of the first base film directs the first metallic film to the lower of said two levels and the metal-contacting film-part of the second base film directs the second metallic film to the lower of said two levels.

17. A method according to claim 16 further comprising the step of depositing an exterior protective overcoat layer over the dielectric antireflective film.

18. A method according to claim 17 wherein the transparent, nonmetallic substrate is glass, the support film-part of the first base film is a zinc stannate film, the crystalline metal-contacting film-part of the first base film is a zinc oxide film, the first metallic reflective film is a silver film, the first primer film is deposited as titanium metal having a thickness of 8 to 12 Angstroms, the second metallic reflective film is a silver film, the second primer film is deposited as titanium metal having a thickness of 8 to 12 Angstroms, and the exterior protective overcoat layer is a titanium oxide film.

19. The method of claim 10 further comprising the step of subjecting the coated article to a heat treatment.

20. The method of claim 19 wherein the nonmetallic substrate is glass and said heat treatment is a tempering heat treatment to temper said glass substrate.

21. The method of claim 13 further comprising the step of subjecting the coated article to a heat treatment.

22. The method of claim 21 wherein the nonmetallic substrate is glass and said heat treatment is a heat treatment to temper said glass substrate.

23. A high transmittance, low emissivity coated article comprising:
   a. a transparent, nonmetallic substrate;
   b. a dielectric, antireflective base film overlying the substrate, the base film including a support film-part overlying said substrate and a crystalline metal-contact film-part overlying the support film-part; and
   c. a metallic-reflective film on the crystalline metal-contact film-part, the metallic film having two levels of electrical resistivity, one level being lower than the other;

wherein the support film-part is chemically and thermally more durable than said crystalline metal-contact film-part, said support film-part bonding said crystalline metal-contact film-part to said substrate and wherein said crystalline metal-contact film-part directs said metallic film to the lower of said two resistivity levels.

24. The high transmittance, low emissivity coated article of claim 23 wherein said base film having said metallic reflective film deposited thereon is included on a multi-layer stack deposited on said substrate.

25. The article of claim 23 wherein the support film-part includes an oxide of zinc and tin.

26. The article of claim 24 wherein the metal-contact film-part is selected from the group consisting of indium tin oxide, zinc-aluminum oxide and zinc oxide.

27. The article according to claim 1 wherein said base film is deposited on said substrate.

28. The article according to claim 4 wherein said first base film is deposited on said substrate.

29. The article according to claim 7 wherein said first base film is deposited on said substrate.

30. The method according to claim 10 wherein said base film is deposited on said substrate.

31. The method of claim 13 wherein said first base film is deposited on said substrate.

32. The method of claim 16 wherein said first base film is deposited on said substrate.

33. A high transmittance, low emissivity coated article comprising:
   a. a transparent, nonmetallic substrate;
   b. a first dielectric, antireflective base film overlying the substrate, the first base film including a zinc-tin oxide support film-part overlying the substrate and a crystalline metal-contacting film part selected from the group consisting of indium tin oxide, zinc-aluminum oxide and zinc oxide overlying the support film-part;
   c. a first metallic reflective film deposited on the crystalline metal-contacting film-part of the first base film, the metallic film having two levels of electrical resistivity, one level being lower than the other;
   d. a first primer film overlying the first metallic reflective film;
   e. a second dielectric, antireflective base film overlying the first primer film;
   f. a second metallic reflective film overlying the second base film;
   g. a second primer film overlying the second metallic reflective film; and
   h. a dielectric, antireflective film overlying the second primer film;

wherein the metal-contacting film-part of the first base film directs the first metallic film to the lower of said two levels.

34. The coated article according to claim 33 wherein the first base film is deposited on the substrate.

35. A high transmittance, low emissivity coated article comprising:
   a. a transparent, nonmetallic substrate;
   b. a first dielectric, antireflective base film overlying the substrate;
   c. a first metallic reflective film overlying the first base film;
   d. a first primer film overlying the first metallic reflective film;
   e. a second dielectric, antireflective base film overlying the first primer film, the second base film including a zinc-tin oxide support film-part overlying the first primer film and a crystalline metal-contacting film-part selected from the group consisting of indium tin oxide, zinc aluminum oxide and zinc oxide overlying the support film-part;
   f. a second metallic reflective film deposited on the crystalline metal-contacting film-part of the second base film, the metallic film having two levels of electrical resistivity, one level being lower than the other;
   g. a second primer film overlying the second metallic reflective film; and
   h. a dielectric, antireflective film overlying the second primer film;
wherein the metal-contacting film-part of the second base film directs the second metallic film to the lower of said two levels.

36. A method for making a high transmittance, low emissivity coated article comprising the steps of:
   a. selecting a transparent, nonmetallic substrate;
   b. depositing a first dielectric, antireflective base film on the substrate, the first base film including a zinc-tin oxide support film-part overlying the substrate and a crystalline metal-contacting film-part selected from the group consisting of indium tin oxide, zinc aluminum oxide and zinc oxide overlying the support film-part;
   c. depositing a first metallic reflective film on the crystalline metal-contacting film-part of the first base film, the metallic film having two levels of electrical resistivity, one level being lower than the other;
   d. depositing a first primer film over the first metallic reflective film;
   e. depositing a second dielectric, antireflective base film over the first primer film;
   f. depositing a second metallic reflective film over the second base film;
   g. depositing a second primer film over the second metallic reflective film; and
   h. depositing a dielectric, antireflective film over the second primer film;
wherein the metal-contacting film-part of the first base film directs the first metallic film to the lower of said two levels.

37. The method according to claim 36 wherein the first base film is deposited on the substrate.

38. A method for making a high transmittance, low emissivity coated article comprising the steps of:
   a. selecting a transparent, nonmetallic substrate;
   b. depositing a first dielectric, antireflective base film over the substrate;
   c. depositing a first metallic reflective film over the first base film;
   d. depositing a first primer film over the first metallic reflective film;
   e. depositing a second dielectric, antireflective base film over the first primer film, the second base film including a zinc-tin oxide support film-part overlying the first primer film and a crystalline metal-contacting film-part selected from the group consisting of indium tin oxide, zinc-aluminum oxide and zinc oxide overlying the support film-part;
   f. depositing a second metallic reflective film on the crystalline metal-contacting film-part of the second base film, the metallic film having two levels of electrical resistivity, one level being lower than the other;
   g. depositing a second primer film over the second metallic reflective film; and
   h. depositing a dielectric, antireflective film over the second primer film;
wherein the metal-contacting film-part of the second base film directs the second metallic film to the lower of said two levels.

* * * * *